US012658978B2

(12) United States Patent
Patchava et al.

(10) Patent No.: US 12,658,978 B2
(45) Date of Patent: Jun. 16, 2026

(54) CHANNEL ALLOCATION FOR WIRELESS POWER TRANSFER

(71) Applicant: QUALCOMM Incorporated, San Diego, CA (US)

(72) Inventors: Raviteja Patchava, San Diego, CA (US); Piyush Gupta, Bridgewater, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 18/322,884

(22) Filed: May 24, 2023

(65) Prior Publication Data

US 2024/0396587 A1     Nov. 28, 2024

(51) Int. Cl.
| | |
|---|---|
| H04B 5/79 | (2024.01) |
| H04W 72/04 | (2023.01) |
| H04W 72/542 | (2023.01) |

(52) U.S. Cl.
CPC .............. H04B 5/79 (2024.01); H04W 72/04 (2013.01); H04W 72/542 (2023.01)

(58) Field of Classification Search
CPC ............ H04B 5/73; H04B 5/79; H04W 72/54
See application file for complete search history.

(56) References Cited

U.S. PATENT DOCUMENTS

| | | | | | |
|---|---|---|---|---|---|
| 2010/0187913 | A1* | 7/2010 | Smith | ...................... | H02J 50/70 |
| | | | | | 307/104 |
| 2012/0267961 | A1* | 10/2012 | Endo | ........................ | H04B 5/26 |
| | | | | | 307/104 |

| | | | | | |
|---|---|---|---|---|---|
| 2017/0077995 | A1* | 3/2017 | Leabman | ................ | H02J 50/80 |
| 2019/0181688 | A1* | 6/2019 | Su | ............................. | H04B 5/77 |
| 2019/0273637 | A1* | 9/2019 | Zhang | ................... | H04L 5/0051 |
| 2021/0057940 | A1* | 2/2021 | Park | ........................ | H02J 50/50 |
| 2022/0070836 | A1 | 3/2022 | Balasubramanian et al. | | |

(Continued)

OTHER PUBLICATIONS

Abeywickrama S., et al., "Refined Nonlinear Rectenna Modeling and Optimal Waveform Design for Multi-User Multi-Antenna Wireless Power Transfer", arXiv:2012.15615v1, arxiv.org, Cornell University Library, 201 Olin Library Cornell University Ithaca, NY 14853, Dec. 31, 2020, pp. 1-11 , XP081849527, pp. 3,5-6,10.

(Continued)

*Primary Examiner* — Wen W Huang

(74) *Attorney, Agent, or Firm* — Holland & Hart LLP

(57)     ABSTRACT

Methods, systems, and devices for wireless communications are described. The described techniques provide for a network device to transfer energy to an energy harvesting (EH)-capable device via a multisine waveform. The network device may transmit the multisine waveform according to a multisine waveform configuration that indicates frequency locations for each EH channel of the multisine waveform across a channel bandwidth. In some cases, the network device may determine the multisine waveform configuration according to latency information of the passive IoT device, channel quality measurements for the channel bandwidth, or both. The multisine waveform configuration may indicate a distribution of individual EH channels across the channel bandwidth to improve frequency diversity, may indicate a contiguous grouping of EH channels to improve multisine gain, or a combination thereof.

30 Claims, 16 Drawing Sheets

(56) References Cited

U.S. PATENT DOCUMENTS

| | | | |
|---|---|---|---|
| 2022/0078790 A1* | 3/2022 | Park | H02J 50/90 |
| 2023/0254021 A1* | 8/2023 | Shariati | H04B 7/0689 |
| | | | 370/329 |
| 2023/0299812 A1* | 9/2023 | Kalantari | H02J 50/40 |
| | | | 307/104 |
| 2023/0412003 A1* | 12/2023 | Farhadi | H02J 50/80 |
| 2024/0244537 A1* | 7/2024 | Elshafie | H02J 50/001 |

OTHER PUBLICATIONS

International Search Report and Written Opinion—PCT/US2024/026229—ISA/EPO—Aug. 8, 2024.
Jalali J.F.M., "Resource Allocation for SWIPT in Multi-service Wireless Networks", arXiv:2007.13676v1, arxiv.org, Cornell University Library, 201 Olin Library Cornell University Ithaca, NY 14853, Jul. 4, 2020, 146 Pages, XP081727901, p. 36-p. 37.

* cited by examiner

Bandwidth 410

EH Channel 405      PRB 415

Frequency

400

Channel Group 515

Bandwidth 510

EH Channel 505          PRB 520

500

710

720

715

705

700

130

105

115

Network
Entity

Transceiver

Antenna

1010

1015

Communications
Manager

Memory

Code

1030

1020

1025

1040

Processor

1035

1005

1000

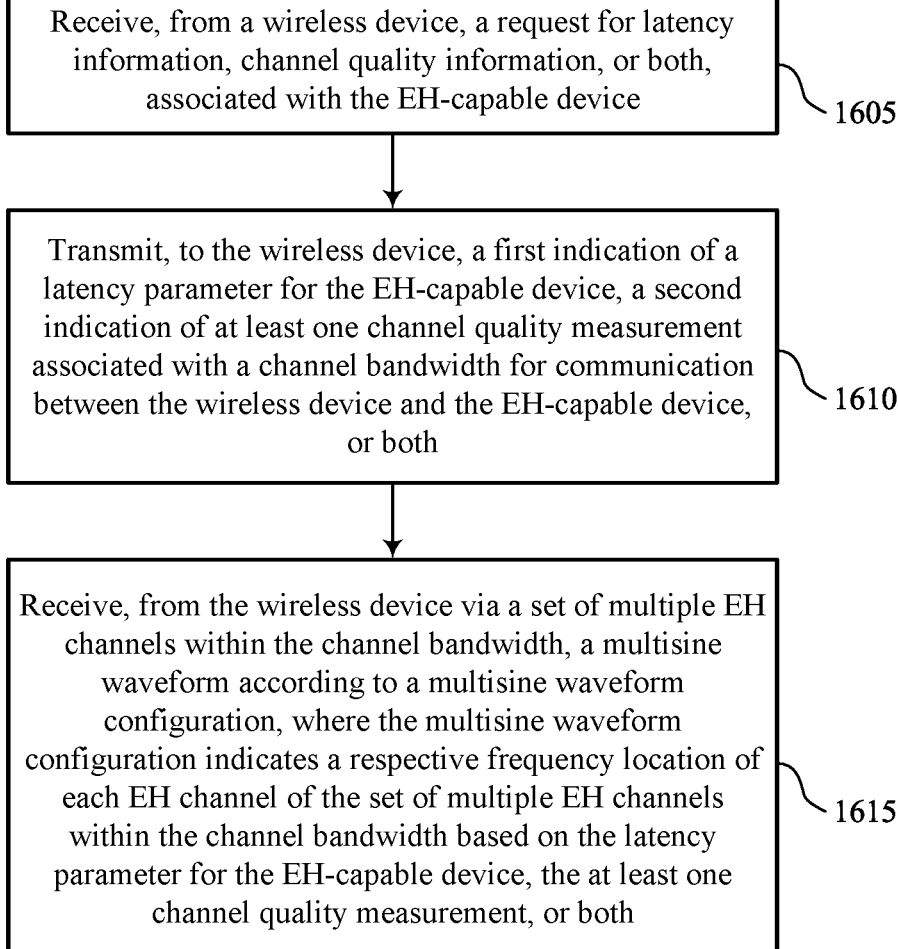

Receive, from a wireless device, a request for latency information, channel quality information, or both, associated with the EH-capable device

1605

Transmit, to the wireless device, a first indication of a latency parameter for the EH-capable device, a second indication of at least one channel quality measurement associated with a channel bandwidth for communication between the wireless device and the EH-capable device, or both

1610

Receive, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both

CHANNEL ALLOCATION FOR WIRELESS POWER TRANSFER

FIELD OF TECHNOLOGY

The following relates to wireless communications, including channel allocation for wireless power transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a wireless device may be an example of an energy harvesting (EH)-capable device, and a network device may provide energy to the EH-capable device wirelessly. For example, the network device may turn on the EH-capable device via a wireless signal.

SUMMARY

The described techniques relate to improved methods, systems, devices, and apparatuses that support channel allocation for wireless power transfer. For example, the described techniques provide for a wireless device to transfer energy to an energy harvesting (EH)-capable device via a multisine waveform. In some cases, a configuration of the multisine waveform may depend on latency information associated with the EH-capable device, channel quality information associated with a channel bandwidth for communication between the wireless device and the EH-capable device, or both. For example, the wireless device may transmit a request for the latency information, the channel quality information, or both, and may receive a latency parameter for the EH-capable device, at least one channel quality measurement, or both. The wireless device may transmit the multisine waveform according to a multisine waveform configuration indicating a respective frequency location of multiple EH channels within the channel bandwidth.

A method for wireless communications at a wireless device is described. The method may include transmitting a request for latency information, channel quality information, or both, associated with an EH-capable device, receiving, from the EH-capable device, a first indication of a latency parameter for the EH-capable device, a second indication of at least one channel quality measurement associated with a channel bandwidth for communication between the wireless device and the EH-capable device, or both, and transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

An apparatus for wireless communications at a wireless device is described. The apparatus may include at least one processor, at least one memory coupled with the at least one processor, and instructions stored in the at least one memory. The instructions may be executable by the at least one processor to cause the apparatus to transmit a request for latency information, channel quality information, or both, associated with an EH-capable device, receive, from the EH-capable device, a first indication of a latency parameter for the EH-capable device, a second indication of at least one channel quality measurement associated with a channel bandwidth for communication between the wireless device and the EH-capable device, or both, and transmit, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

Another apparatus for wireless communications at a wireless device is described. The apparatus may include means for transmitting a request for latency information, channel quality information, or both, associated with an EH-capable device, means for receiving, from the EH-capable device, a first indication of a latency parameter for the EH-capable device, a second indication of at least one channel quality measurement associated with a channel bandwidth for communication between the wireless device and the EH-capable device, or both, and means for transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

A non-transitory computer-readable medium storing code for wireless communications at a wireless device is described. The code may include instructions executable by a processor to transmit a request for latency information, channel quality information, or both, associated with an EH-capable device, receive, from the EH-capable device, a first indication of a latency parameter for the EH-capable device, a second indication of at least one channel quality measurement associated with a channel bandwidth for communication between the wireless device and the EH-capable device, or both, and transmit, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

In some examples of the method, apparatuses, and non-transitory computer-readable medium described herein, the multisine waveform configuration indicates one or more EH channel groups, each EH channel group of the one or more EH channel groups including a respective subset of the set of multiple EH channels.

In some examples of the method, apparatuses, and non-transitory computer-readable medium described herein, the multisine waveform configuration indicates that the one or more EH channel groups may be uniformly distributed across the channel bandwidth.

In some examples of the method, apparatuses, and non-transitory computer-readable medium described herein, a quantity of the one or more EH channel groups may be based on the at least one channel quality measurement.

In some examples of the method, apparatuses, and non-transitory computer-readable medium described herein, the multisine waveform configuration indicates a first frequency location of a first subset of EH channels of the set of multiple EH channels and a second frequency location of a second subset of EH channels of the set of multiple EH channels based on the latency parameter for the EH-capable device, the first subset of EH channels including a first set of contiguous physical resource blocks (PRBs) of the channel bandwidth and the second subset of EH channels including a second set of contiguous PRBs of the channel bandwidth.

In some examples of the method, apparatuses, and non-transitory computer-readable medium described herein, the first frequency location corresponds to a first edge of the channel bandwidth and the second frequency location corresponds to a second edge of the channel bandwidth.

In some examples of the method, apparatuses, and non-transitory computer-readable medium described herein, the first frequency location and the second frequency location may be spaced apart in frequency based on a frequency spacing value that corresponds to the at least one channel quality measurement.

In some examples of the method, apparatuses, and non-transitory computer-readable medium described herein, the multisine waveform configuration indicates that the set of multiple EH channels may be distributed across the channel bandwidth based on the latency parameter for the EH-capable device and at least one physical intervening resource block separates each pair of EH channels of the set of multiple EH channels.

In some examples of the method, apparatuses, and non-transitory computer-readable medium described herein, the multisine waveform configuration indicates that the set of multiple EH channels includes a set of contiguous PRBs of the channel bandwidth based on the latency parameter for the EH-capable device.

In some examples of the method, apparatuses, and non-transitory computer-readable medium described herein, a frequency location of the set of contiguous PRBs may be based on the at least one channel quality measurement of the channel bandwidth.

In some examples of the method, apparatuses, and non-transitory computer-readable medium described herein, the latency parameter may be based on a battery level of the EH-capable device, a type of the EH-capable device, or both.

A method for wireless communications at an EH capable device is described. The method may include receiving, from a wireless device, a request for latency information, channel quality information, or both, associated with the EH-capable device, transmitting, to the wireless device, a first indication of a latency parameter for the EH-capable device, a second indication of at least one channel quality measurement associated with a channel bandwidth for communication between the wireless device and the EH-capable device, or both, and receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

An apparatus for wireless communications at an EH capable device is described. The apparatus may include at least one processor, at least one memory coupled with the at least one processor, and instructions stored in the at least one memory. The instructions may be executable by the at least one processor to cause the apparatus to receive, from a wireless device, a request for latency information, channel quality information, or both, associated with the EH-capable device, transmit, to the wireless device, a first indication of a latency parameter for the EH-capable device, a second indication of at least one channel quality measurement associated with a channel bandwidth for communication between the wireless device and the EH-capable device, or both, and receive, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

Another apparatus for wireless communications at an EH capable device is described. The apparatus may include means for receiving, from a wireless device, a request for latency information, channel quality information, or both, associated with the EH-capable device, means for transmitting, to the wireless device, a first indication of a latency parameter for the EH-capable device, a second indication of at least one channel quality measurement associated with a channel bandwidth for communication between the wireless device and the EH-capable device, or both, and means for receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

A non-transitory computer-readable medium storing code for wireless communications at an EH capable device is described. The code may include instructions executable by a processor to receive, from a wireless device, a request for latency information, channel quality information, or both, associated with the EH-capable device, transmit, to the wireless device, a first indication of a latency parameter for the EH-capable device, a second indication of at least one channel quality measurement associated with a channel bandwidth for communication between the wireless device and the EH-capable device, or both, and receive, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

In some examples of the method, apparatuses, and non-transitory computer-readable medium described herein, the multisine waveform configuration indicates one or more EH channel groups, each EH channel group of the one or more EH channel groups including a respective subset of the set of multiple EH channels.

In some examples of the method, apparatuses, and non-transitory computer-readable medium described herein, the multisine waveform configuration indicates that the one or more EH channel groups may be uniformly distributed across the channel bandwidth.

In some examples of the method, apparatuses, and non-transitory computer-readable medium described herein, a quantity of the one or more EH channel groups may be based on the at least one channel quality measurement.

In some examples of the method, apparatuses, and non-transitory computer-readable medium described herein, the multisine waveform configuration indicates a first frequency location of a first subset of EH channels of the set of multiple EH channels and a second frequency location of a second subset of EH channels of the set of multiple EH channels based on the latency parameter for the EH-capable device, the first subset of EH channels including a first set of contiguous PRBs of the channel bandwidth and the second subset of EH channels including a second set of contiguous PRBs of the channel bandwidth.

In some examples of the method, apparatuses, and non-transitory computer-readable medium described herein, the first frequency location corresponds to a first edge of the channel bandwidth and the second frequency location corresponds to a second edge of the channel bandwidth.

In some examples of the method, apparatuses, and non-transitory computer-readable medium described herein, the first frequency location and the second frequency location may be spaced apart in frequency based on a frequency spacing value that corresponds to the at least one channel quality measurement.

In some examples of the method, apparatuses, and non-transitory computer-readable medium described herein, the multisine waveform configuration indicates that the set of multiple EH channels may be distributed across the channel bandwidth based on the latency parameter for the EH-capable device and at least one physical intervening resource block separates each pair of EH channels of the set of multiple EH channels.

In some examples of the method, apparatuses, and non-transitory computer-readable medium described herein, the multisine waveform configuration indicates that the set of multiple EH channels includes a set of contiguous PRBs of the channel bandwidth based on the latency parameter for the EH-capable device.

In some examples of the method, apparatuses, and non-transitory computer-readable medium described herein, a frequency location of the set of contiguous PRBs may be based on the at least one channel quality measurement.

In some examples of the method, apparatuses, and non-transitory computer-readable medium described herein, the latency parameter may be based on a battery level of the EH-capable device, a type of the EH-capable device, or both.

BRIEF DESCRIPTION OF THE DRAWINGS

FIGS. 15 and 16 show flowcharts illustrating methods that support channel allocation for wireless power transfer in accordance with one or more aspects of the present disclosure.

DETAILED DESCRIPTION

Figure 1:
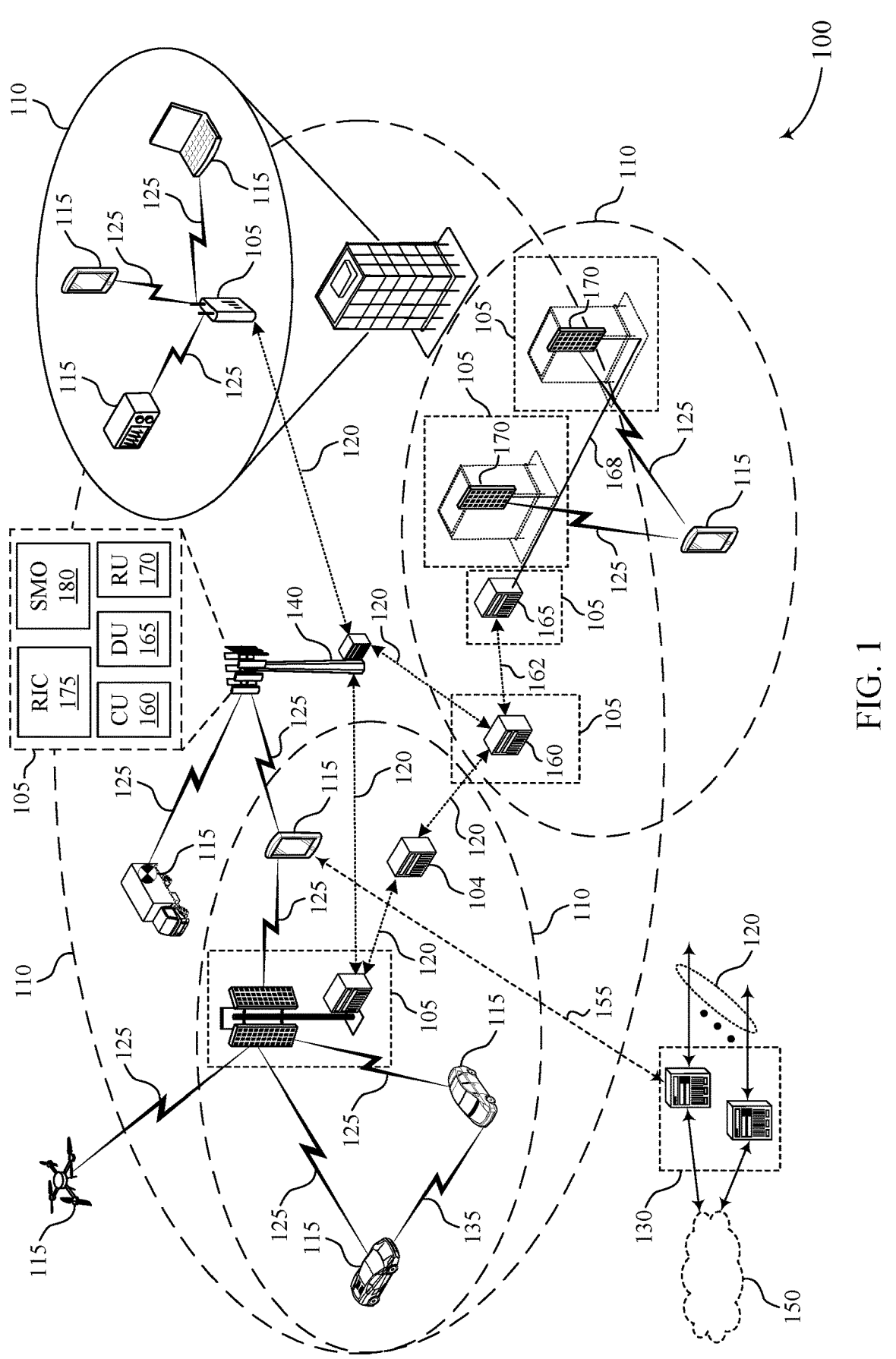
FIG. 1 shows an example of a wireless communications system that supports channel allocation for wireless power transfer in accordance with one or more aspects of the present disclosure.

In some wireless communications systems, a network device (e.g., a network entity or a user equipment (UE)) may wirelessly provide energy to one or more devices, such as passive internet-of-things (IoT) devices (e.g., ambient IoT devices). For example, the network device may transmit a waveform via one or more energy harvesting (EH) channels (e.g., portions of a frequency bandwidth) and a passive IoT device may receive, and harvest energy from, the EH channels. In some cases, the EH waveform may be a multisine waveform that includes multiple sine waves transmitted across multiple different frequency bands (e.g., different EH channels). However, an efficiency of transferring energy via a multisine waveform may depend on a spacing between frequencies of EH channels, and a performance of the energy transfer may be impacted by the distribution of the EH channels. For example, the network device may place EH channels in consecutive frequency bands (e.g., consecutive physical resource blocks (PRBs)), which may improve transfer energy efficiency when wireless conditions are relatively strong within the consecutive frequency bands, but may decrease transfer energy efficiency when wireless conditions are degraded (e.g., significant fading occurs) within the consecutive frequency bands. Additionally, or alternatively, the network device may place the EH channels spaced apart in frequency, which may increase a robustness of the energy transfer (e.g., when channel conditions are poor in selected EH channels), but may result in less efficient energy transfer.

To support selecting EH channels for a multisine waveform, a network device may transmit the multisine waveform according to a multisine waveform configuration that indicates frequency locations for each EH channel of the multisine waveform across a channel bandwidth. In some cases, the network device may determine the multisine waveform configuration according to latency information of the passive IoT device, channel quality measurements for the channel bandwidth, or both. For example, the multisine waveform configuration may indicate a distribution of individual EH channels across the channel bandwidth (e.g., spacing the EH channels apart in frequency) based on a first latency parameter (e.g., a stringent latency constraint), or may indicate a contiguous grouping of the EH channels based on a second latency parameter (e.g., no latency constraint). Additionally, or alternatively, the frequency locations of the EH channels may be selected according to channel state information (CSI) reporting (e.g., the network device may select PRBs of the bandwidth with a best CSI as the EH channels). Thus, the techniques may balance efficient power transfer in light of channel conditions Aspects of the disclosure are initially described in the context of wireless communications systems. Aspects of the disclosure are further illustrated by and described with reference to waveform configurations and a process flow. Aspects of the disclosure are further illustrated by and described with reference to apparatus diagrams, system diagrams, and flowcharts that relate to channel allocation for wireless power transfer.

FIG. 1 shows an example of a wireless communications system 100 that supports channel allocation for wireless power transfer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or Rus 170, and the one or more DUs 165 or Rus 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more Rus 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more Rus 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more Rus 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support channel allocation for wireless power transfer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, Rus 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as the wireless communications system 100, one or more services performed by a wireless device (e.g., eMBB services, URLLC services, MTC services, or the like) may support passive IoT devices. For example, the wireless device (e.g., a network entity 105 or a UE 115) may manage one or more passive IoT devices, such as a radio frequency identification (RFID)-type sensor (e.g., used for asset management, logistics, warehousing, manufacturing, or the like). For example, a network entity 105 may read information stored to a passive IoT device, may write information to a passive IoT device, may receive signals (e.g., information-bearing signals) reflected from the passive IoT device (e.g., reading a reflected signal to decode information transmitted by an IoT device), or any combination thereof.

Additionally, or alternatively, the network entity 105 may provide energy to one or more passive IoT devices. For example, a passive IoT device may be an example of an EH-capable device, which may support radio frequency power harvesting. The EH-capable device may include power harvesting circuitry capable of receiving a waveform and harvesting energy from the waveform. For example, the power harvesting circuitry may begin to operate (e.g., turn on) after receiving a waveform that satisfies a threshold input power (e.g., −20 dBm, −10 dBm, or some other threshold), which may correspond to a turn-on voltage of diodes included in the power harvesting circuitry. In some cases, the harvested power may be non-linear with the input power (e.g., due to the diode turn-on voltage) and may be more efficient at lower frequencies (e.g., frequency-selective conversion efficiency due to diode junction capacitance and resistance).

In some cases, a range of transferring energy may be improved by using a multisine waveform (e.g., compared to a continuous wave transmission), which may include energy that is transmitted across multiple frequencies. For example, the network entity 105 may transmit multiple sine waves via multiple different frequency bands, which may be PRBs of a channel bandwidth, ambient IoT channels, EH channels, or any combination thereof. In some cases, an efficiency of the energy transfer via a multisine waveform may depend on a spacing between the frequency bands carrying sine waves. As an example, if multiple ambient IoT channels co-exist with one or more data channels (e.g., non-standalone (NSA) channels), a distribution of the IoT channel across the channel bandwidth may affect energy transfer performance.

In some cases, the network entity 105 may select frequency locations for EH channels such that the EH channels are continuous in frequency (e.g., separated by a subcarrier spacing, such a 15 kHz), spaced across the channel bandwidth (e.g., a uniform spacing across a 20 MHz band), or a combination thereof. For example, a complementary cumulative distribution function (CCDF) and average DC output current at an EH-capable device may vary for different spacings of a multisine waveform for tap delay line (TDL)-C channels (e.g., assuming no channel state information at transmitter (CSIT) is available).

In some examples, such as when CSI information is unavailable to the transmitting device, continuously spaced EH channels may support a greater average output current (e.g., a DC output current), but may be sensitive to channel conditions between the network entity 105 and the passive IoT device. For instance, continuously spaced EH channels may decrease transfer energy efficiency when wireless conditions are degraded (e.g., significant channel fading) within consecutive PRBs of the EH channels. Additionally, or alternatively, uniformly spaced EH channels may improve a consistency of the energy transfer (e.g., compared to continuously spaced EH channels). For example, the network entity 105 may space the EH channels individually across the channel bandwidth (e.g., leveraging a frequency diversity gain of the channel bandwidth to mitigate or reduce an effect of channel conditions on energy transfer efficiency).

In some cases, such as if CSI information is available to the transmitting device (e.g., with a matched filter at the transmitting device (e.g., a perfect CSI)), a spacing of the EH channels for a multisine waveform may be based on a quantity of EH channels associated with the multisine waveform. For example, uniformly spaced EH channels across the channel bandwidth (e.g., a 20 MHz band) may support a higher average output current than contiguous EH channels separated by a subcarrier spacing (e.g., such as 15 KHz) up to a quantity of the EH channels (e.g., after a threshold quantity of tones, contiguously spaces tones achieve a better performance than uniformly spaced tones).

By configuring a multisine waveform according to information of the EH-capable device and channel quality information, an efficiency of the energy transfer may be improved.

Figure 2:
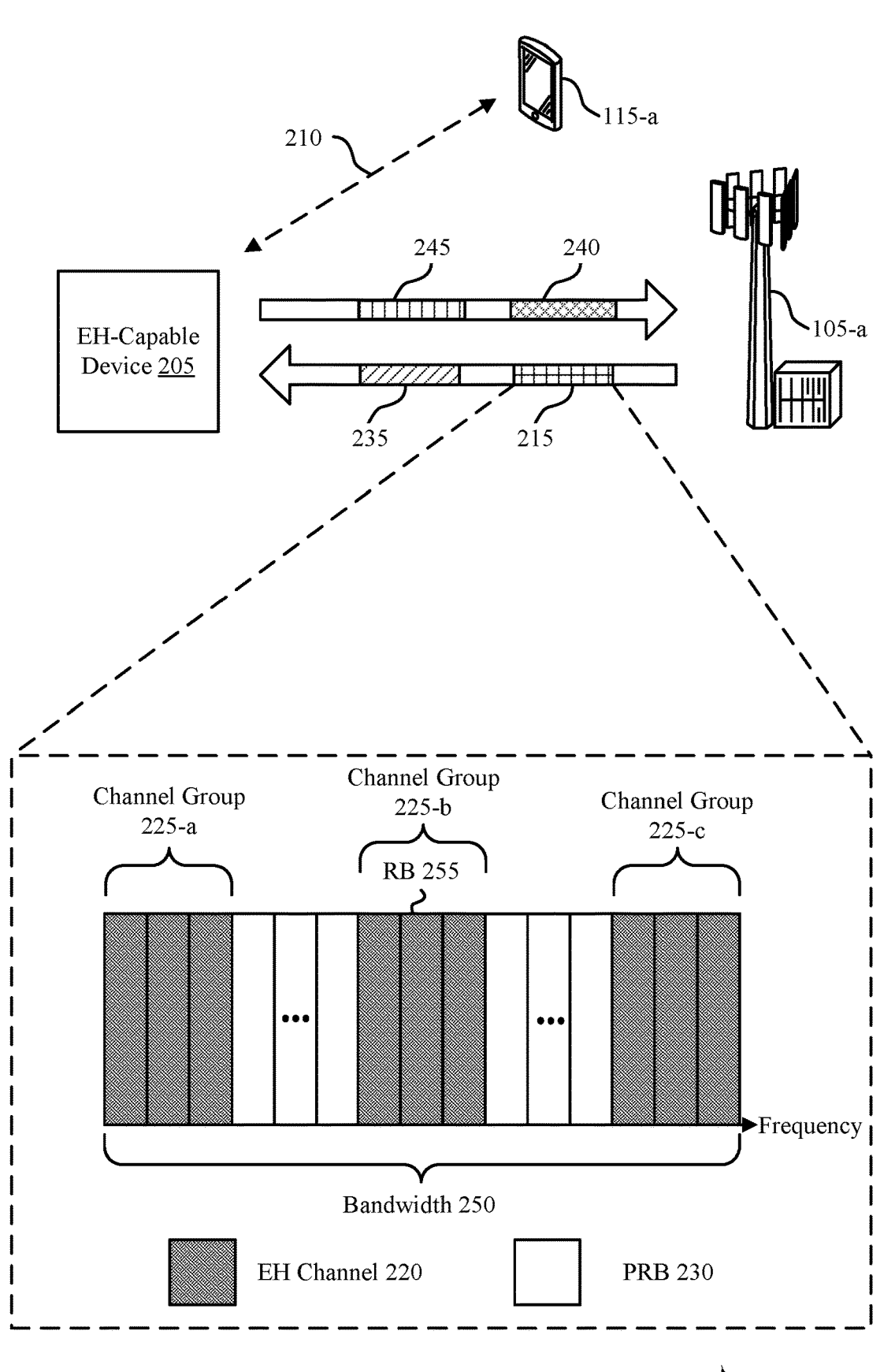
FIG. 2 shows an example of a wireless communications system that supports channel allocation for wireless power transfer in accordance with one or more aspects of the present disclosure.

FIG. 2 shows an example of a wireless communications system 200 that supports channel allocation for wireless power transfer in accordance with one or more aspects of the present disclosure. The wireless communications system 200 may implement one or more aspects of the wireless communications system 100. For example, the wireless communications system 200 may include a network entity 105-a, a UE 115-a, and an EH-capable device 205 (e.g., a passive IoT device, an MTC device, or the like), which may be examples of corresponding deices descried with reference to FIG. 1. The wireless communications system 200 may support the network entity 105-a transferring energy to the EH-capable device 205 via a multisine waveform, which may be configured according to latency information of the EH-capable device 205, channel conditions between the network entity 105-a and the EH-capable device 205, or both. It should be noted that signaling performed between the network entity 105-a and the EH-capable device 205 may alternatively be performed between the UE 115-a and the EH-capable device 205 via a link 210.

In some examples, the network entity 105-a may transfer energy to the EH-capable device 205 via a multisine waveform 215. In some cases, the multisine waveform 215 may include one or more EH channels 220 (e.g., ambient IoT channels), which may carry energy for the EH-capable device 205 to harvest. For example, the multisine waveform 215 may include one or more channel groups 225 (e.g., n groups), such as a channel group 225-a, a channel group 225-b, and a channel group 225-c. In some cases, each channel group 225 may include a quantity of continuous EH channels 220 (e.g., m channels per group for a total of nm channels) and may be separated by one or more PRBs 230 of a channel bandwidth 250 for communications between the network entity 105-a and the EH-capable device 205. The network entity 105-a may transmit one or more tones (e.g., subcarriers) associated with each EH channel 220. For example, the network entity 105-a may transmit each tone of an EH channel 220 (e.g., twelve contiguous tones of a resource block (RB)) with a same amplitude, a same phase, or both. As another example, the network entity 105-a may transmit a subset of the tones of an EH channel 220 (e.g., one tone with a power equivalent to twelve tones).

In some cases, the network entity 105-a may configure the multisine waveform 215 according to a multisine waveform configuration, which may indicate a frequency location of the EH channels 220 of the multisine waveform 215 within the channel bandwidth 250. For example, the network entity 105-a may place each channel group 225 uniformly across the channel bandwidth 250 (e.g., each channel group 225 separated by a same quantity of PRBs 230). Such a multisine waveform configuration may support improved multisine gain (e.g., due to continuous EH channels 220 in each channel group 225) while maintaining frequency diversity gain (e.g., due to the separation of the channel groups 225).

In some examples, the network entity 105-a may determine the multisine waveform configuration according to a quality of the channel bandwidth 250, latency information associated with the EH-capable device 205, or both. For example, the network entity 105-a may transmit an information request 235, which may request the EH-capable device 205 to indicate latency information of the EH-capable device 205, channel state information (CSI) of the channel bandwidth 250, or both. In some cases, the EH-capable device 205 may transmit a latency parameter 240 (e.g., a first indication) indicating a latency constraint associated with the EH-capable device 205. As an example, the latency parameter 240 may indicate a first latency level (e.g., a stringent latency constraint), a second latency level (e.g., a moderate latency constraint), or a third latency level (e.g., no latency constraint) of the EH-capable device 205, among other examples. In some cases, the latency parameter may be associated with a battery level of the EH-capable device 205 (e.g., a battery capacity, a current battery life, or both), a type of the EH-capable device 205, or both. For example, if the EH-capable device 205 is an example of a tag for a sensor application, the EH-capable device 205 may be associated with a relatively stringent latency constraint. The network entity 105-a may configure the multisine waveform 215 according to the latency parameter 240, as described further below with reference to FIGS. 3A through 5.

Additionally, or alternatively, the EH-capable device 205 may transmit one or more channel quality measurements 245 (e.g., a second indication) associated with the channel bandwidth 250. For example, the network entity 105-a may receive a signal (e.g., a backscatter signal) indicating one or more channel conditions to determine the multisine waveform configuration. In some examples, the network entity 105-a may fix the allocation of EH channels 220 (e.g., fixed IoT channel allocation during multiple wireless channel variations) and may configure the multisine waveform 215 according to the fixed channel allocation scheme with CSI available. In such examples, the network entity 105-a may select a quantity of channel groups 225 (e.g., to improve or maximize diversity gain) according to a quantity of available channels, a bandwidth for the multisine waveform, or both. For example, the network entity 105-a may determine the quantity of channel groups 225 (e.g., n uniformly spaced groups) according to a channel model, where the quantity may be correlated with a bandwidth constraint (e.g., with a tap delay line (TDL)-C channel model at a 100 ns delay spread, n may be equal to 20). In some examples, if the CSI (e.g., reported by the EH-capable device 205 or measured by the network entity 105-a) indicates relatively good channel conditions, the network entity 105-a may select a quantity of channel groups 225 that is less than if the CSI indicates relatively poor channel conditions (e.g., a greater quantity of channel groups 225 may be used to accommodate poor channel conditions). The network entity 105-a may then select a quantity of EH channels 220 to include in each channel group 225 (e.g., to improve or maximize multisine performance). In an example, channel information, such as CSI, may be available at a reader for a transmission, and an ambient IoT channel allocation may be fixed during multiple wireless channel variations. In such an example, depending on the quantity of available channels and the bandwidth for ambient IoT, the number of groups n may be selected to increase (e.g., maximize) diversity gain. In some cases, the maximum value of n may be determined based on a channel model. In some examples, as the value of n increases, the bandwidth requirement increases. For example, with TDL-C channel at 100 ns delay spread, n can be selected as 20, and the value of m may be selected to increase (e.g., maximize) the multi-sine performance.

Figures 3A, 3B:
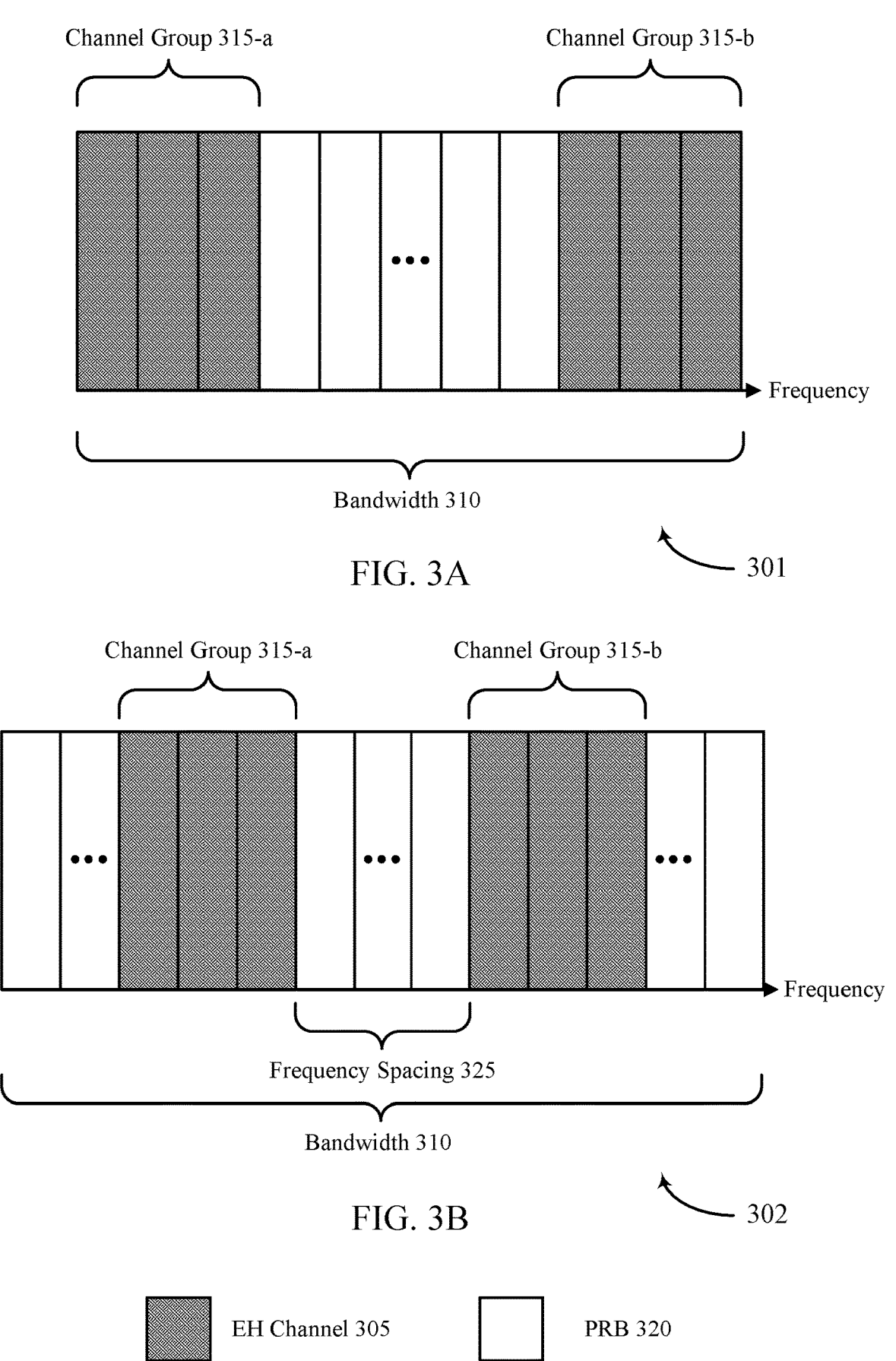
FIGS. 3A and 3B show examples of waveform configurations that support channel allocation for wireless power transfer in accordance with one or more aspects of the present disclosure.

In some other examples, the network entity 105-a may support a variable EH channel 220 allocation (e.g., IoT channel allocation may be varied for each wireless channel variation). In such examples, the network entity 105-a may identify an RB 255 of the channel bandwidth 250 with a highest gain (e.g., according to the channel quality measurements 245) and may place the EH channels 220 continuously around the RB 255 (e.g., n=1). For example, the network entity 105-a may identify CSI associated with each RB of the channel bandwidth 250, and may determine that the RB 255 has a CSI indicating a highest channel quality (e.g., gain). The network entity 105-a may configure a single channel group 225 that includes each EH channel 220 of the multisine waveform, and may place the channel group 225 such that the EH channels 220 surround the RB 255 with the highest gain (e.g., to maximize multisine performance and channel gain). In an example, channel information, such as CSI, may be available at a reader for a transmission, and an ambient IoT channel allocation may be varied for each wireless channel variation. In this case, the channel with the highest gain may be selected based on observed CSI, and the ambient IoT channels amy be placed contiguously around the selected channel (e.g., channel with the best CSI) to achieve improved (e.g., highest) multi-sine and channel gains FIGS. 3A and 3B show examples of a waveform configuration 301 and a waveform configuration 302, respectively, that support channel allocation for wireless power transfer in accordance with one or more aspects of the present disclosure. The waveform configurations 301 and 302 may be implemented by one or more aspects of the wireless communications system 100 and the wireless communications system 200. For example, the waveform configurations 301 and 302 may be examples of multisine waveforms transmitted by a network entity 105 to transfer energy to an EH-capable device, which may be examples of corresponding devices described with reference to FIGS. 1 and 2. In some cases, the network entity 105 may transmit the multisine waveform according to a multisine waveform configuration, which may indicate frequency locations of EH channels 305 (e.g., ambient IoT channels) across a bandwidth 310 (e.g., a channel bandwidth for communication between the network entity 105 and the EH-capable device). In some examples, the waveform configurations 301 and 302 may be examples of multisine waveform configurations based on a latency constraint of the EH-capable device (e.g., a moderate latency constraint).

FIG. 3A illustrates the waveform configuration 301, which may balance frequency diversity and multisine gain without CSI associated with the bandwidth 310 being available to the network entity 105. In some cases, the waveform configuration 301 may include one or more groups of EH channels 305. For example, the network entity 105 may place the EH channels 305 in a channel group 315-*a* and a channel group 315-*b* (e.g., n=2), which may be separated by one or more PRBs 320 of the bandwidth 310 (e.g., a 20 MHz band). In some examples, the network entity 105 may select frequency locations for the channel group 315-*a* and the channel group 315-*b* according to the latency constraint of the EH-capable device, which may indicate that the EH-capable device is associated with applications that allow for moderate latency. For example, the network entity 105 may allocate EH channels 305 at each edge of the bandwidth 310 to support frequency diversity, which may increase a likelihood that at least a portion of the EH channels 305 are not placed at RBs of the bandwidth 310 experiencing poor channel conditions. In some cases, the frequency diversity may support the EH-capable device receiving at least the portion of the EH channels 305 and harvesting energy to communicate according to the latency constraint (e.g., satisfying the latency constraint). Further, the network entity 105-*a* may allocate continuously spaced EH channels 305 next to the edge EH channels 305 (e.g., forming the channel group 315-*a* and the channel group 315-*b*) to support multisine gain. In some cases, contiguously spaced EH channels 305 may provide more energy to the EH-capable device than EH channels 305 that are separated in frequency (e.g., separated by intervening PRBs 320). Such techniques may support a balance between frequency diversity and multisine gain while maintaining a reduced (e.g., minimal) bandwidth for the EH channels 305.

FIG. 3B illustrates the waveform configuration 302, which may balance frequency diversity and multisine gain when CSI associated with the bandwidth 310 is unavailable to the network entity 105. In some cases, the waveform configuration 302 may include the channel group 315-*a* and the channel group 315-*b* that are spaced according to a frequency spacing 325 (e.g., a lower bandwidth than the waveform configuration 301). In some cases, the network entity 105 may identify the frequency spacing 325 according to channel conditions of the bandwidth 310. For example, the network entity 105 may transmit a reference signal to the EH-capable device and the EH-capable device may backscatter the reference signal. The network entity 105 may then measure the backscatter signal to identify a channel variation of the bandwidth 310 and may determine the frequency spacing 325 (e.g., a coherence bandwidth) according to the channel variation. For example, the channel variation may indicate that frequency diversity is achievable for the multisine waveform by separating EH channels 305 by the frequency spacing 325, which may support a smaller bandwidth usage for the multisine waveform (e.g., as opposed to placing the channel groups 315 at edges of the bandwidth 310). Such techniques may support a balance between frequency diversity and multisine gain while maintaining a reduced (e.g., minimal) bandwidth for the EH channels 305.

Figure 4:
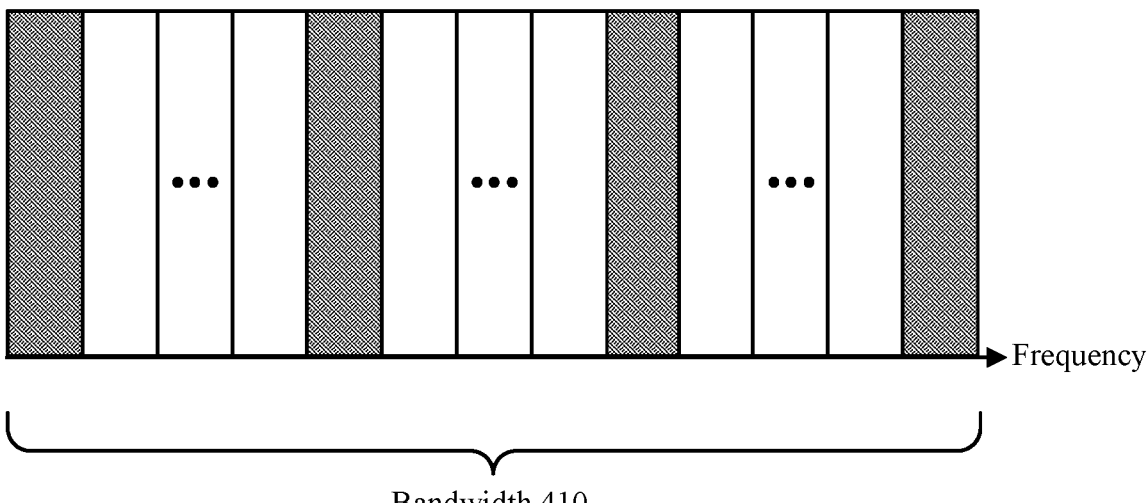
FIG. 4 shows an example of a waveform configuration that supports channel allocation for wireless power transfer in accordance with one or more aspects of the present disclosure.
Figure 4:

FIG. 4 shows an example of a waveform configuration 400 that supports channel allocation for wireless power transfer in accordance with one or more aspects of the present disclosure. The waveform configuration 400 may be implemented by one or more aspects of the wireless communications system 100 and the wireless communications system 200. For example, the waveform configuration 400 may be an example of a multisine waveform transmitted by a network entity 105 to transfer energy to an EH-capable device, which may be examples of corresponding devices described with reference to FIGS. 1 and 2. In some cases, the network entity 105 may transmit the multisine waveform according to a multisine waveform configuration, which may indicate frequency locations of EH channels 405 (e.g., ambient IoT channels) across a bandwidth 410 (e.g., a channel bandwidth for communication between the network entity 105 and the EH-capable device). In some examples, the waveform configuration 400 may be an example of a multisine waveform configuration based on a latency constraint of the EH-capable device (e.g., a relatively stringent latency constraint). For example, the waveform configuration 400 may support a multisine waveform with full frequency diversity gain when CSI of the bandwidth 410 is unavailable to the network entity 105.

In some cases, the network entity 105 may distribute each EH channel 405 across the bandwidth 410 based on the latency constraint of the EH-capable device. For example, the network entity 105 may distribute the EH channels 405 such that at least one intervening PRB 415 of the bandwidth 410 separates each EH channel 405 (e.g., each channel group includes one ambient IoT channel, m=1). In some examples, the network entity 105 may place the individual EH channels 405 across the full bandwidth 410. For example, the network entity 105 may place an EH channel 405 at each edge of the bandwidth 410 and may place the remaining EH channels 405 individually within the bandwidth 410 (e.g., according to a uniform spacing or another spacing). Such techniques may achieve greater frequency diversity gain (e.g., robustness against channel fading) to satisfy the latency constraint of the EH-capable device. For example, the latency constraint may indicate that the EH-capable device performs applications requiring low latency energy transfer. By uniformly spacing EH channels 405 across the bandwidth 410, a likelihood that at least a portion of the EH channels 405 are experiencing poor channel conditions (e.g., significant fading) may be reduced. Thus, the EH-capable device may be more likely to receive at least a portion of the EH channels 405 to harvest energy for performing low-latency communications.

Figure 5:
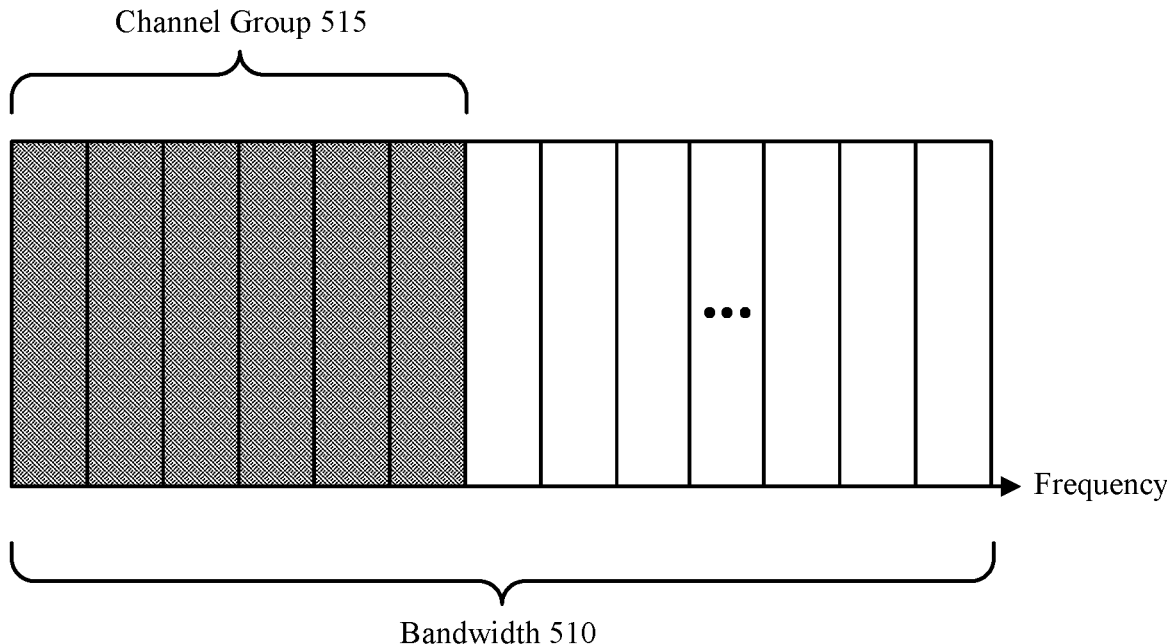
FIG. 5 shows an example of a waveform configuration that supports channel allocation for wireless power transfer in accordance with one or more aspects of the present disclosure.
Figure 5:
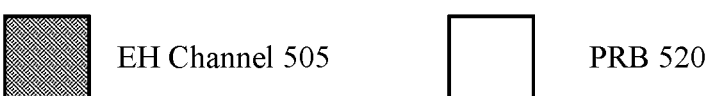

FIG. 5 shows an example of a waveform configuration 500 that supports channel allocation for wireless power transfer in accordance with one or more aspects of the present disclosure. The waveform configuration 500 may be implemented by one or more aspects of the wireless communications system 100 and the wireless communications system 200. For example, the waveform configuration 500 may be an example of a multisine waveform transmitted by a network entity 105 to transfer energy to an EH-capable device, which may be examples of corresponding devices described with reference to FIGS. 1 and 2. In some cases, the network entity 105 may transmit the multisine waveform according to a multisine waveform configuration, which may indicate frequency locations of EH channels 505 (e.g., ambient IoT channels) across a bandwidth 510 (e.g., a channel bandwidth for communication between the network entity 105 and the EH-capable device). In some examples, the waveform configuration 500 may be an example of a multisine waveform configuration based on a latency constraint of the EH-capable device (e.g., no latency constraint). For example, the waveform configuration 400 may support a multisine waveform with full multisine gain when CSI of the bandwidth 410 is unavailable to the network entity 105.

In some examples, the network entity 105 may place the EH channels 505 in a channel group 515, which may be a set of contiguous channels of the bandwidth 510. For example, the network entity 105 may place each EH channel 505 continuously (e.g., n=1) such that no PRBs 520 of the bandwidth 510 separate the EH channels 505. In some cases, such a multisine waveform may support a relatively low bandwidth for the channel group 515 (e.g., compared to the waveform configurations 301, 302, and 400) and may support a relatively high output current at the EH-capable device (e.g., an average DC current may be higher for contiguous channels despite sacrificing frequency diversity). Such techniques may achieve greater multisine gain (e.g., greater energy transfer performance) due to the latency constraint of the EH-capable device. For example, the contiguously spaced EH-channels 505 may increase an amount of energy harvested by the EH-capable device when receiving the multisine waveform. In some cases, such as if the latency constraint indicates that the EH-capable device performs applications with a specific latency requirement, or that have a lenient latency requirement, the EH-capable device may receiving the multisine waveforms in consecutive EH channels to improve multi-sine gain, and hence enhanced energy harvesting is possible when channel conditions are good. Thus, the energy transfer may be more efficient when channel conditions are good.

Figure 6:
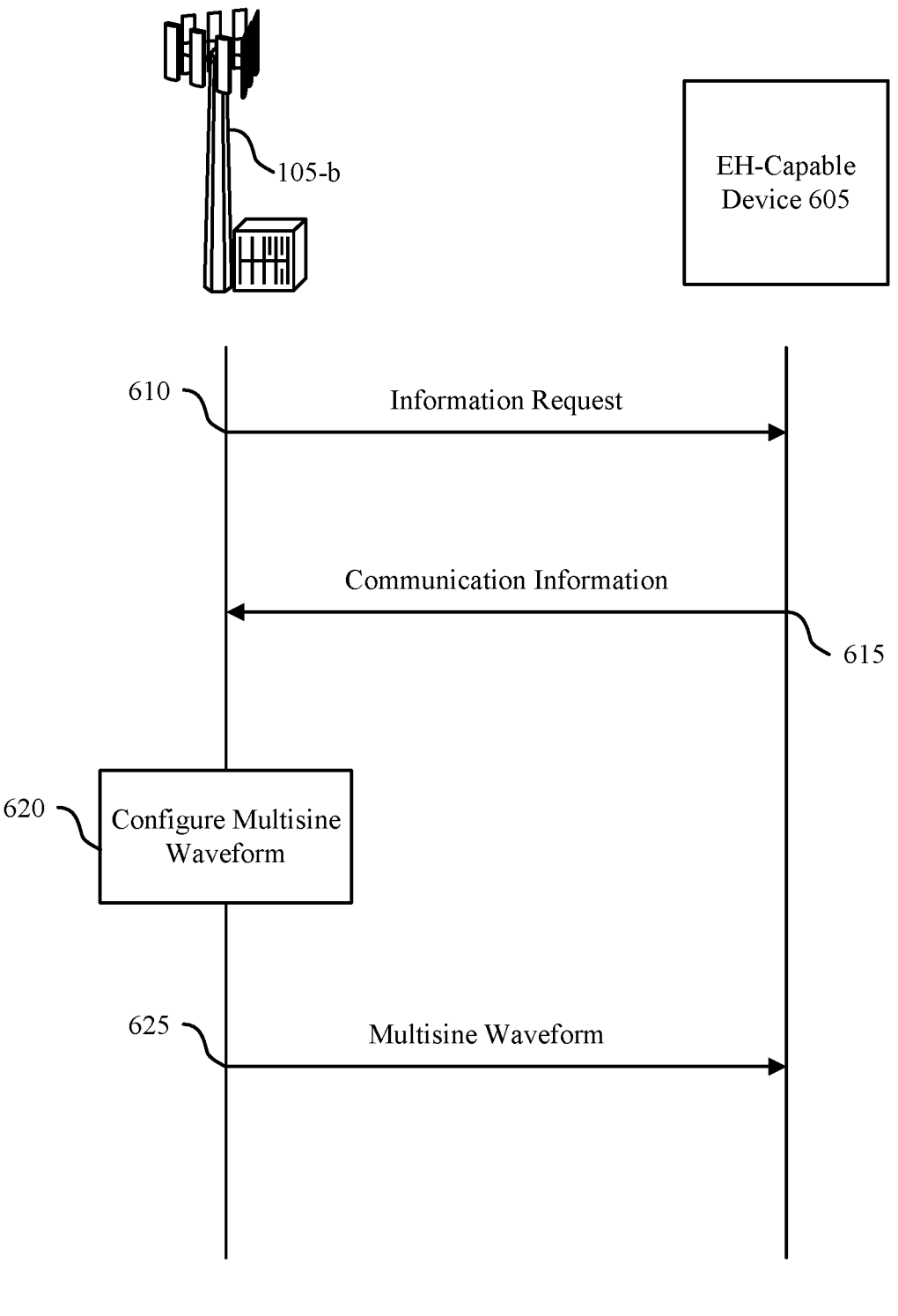
FIG. 6 shows an example of a process flow that supports channel allocation for wireless power transfer in accordance with one or more aspects of the present disclosure.

FIG. 6 shows an example of a process flow 600 that supports channel allocation for wireless power transfer in accordance with one or more aspects of the present disclosure. The process flow 600 may implement, or be implemented by, one or more aspects of the wireless communications system 100 and 200, as well as the waveform configurations 301, 302, 400, and 500. For example, the process flow 600 may be an example of signaling between a network entity 105-*b* (e.g., a transmitting wireless device, which may also be an example of a UE 115) and an EH-capable device 605, which may be examples of corresponding devices described with reference to FIGS. 1 and 2. In some cases, the process flow 600 may support the network entity 105-*b* transferring energy to the EH-capable device 605 via a multisine waveform that is configured according to a multisine waveform configuration, as described with reference to FIGS. 2 through 5. Alternative examples of the following may be implemented, where some processes are performed in a different order than described or are not performed. In some cases, processes may include additional features not mentioned below, or further processes may be added.

At 610, the network entity 105-*b* may transmit a request for information from the EH-capable device 605. For example, the network entity 105-*b* may request latency information, channel quality information, or both associated with the EH-capable device 605.

At 615, the EH-capable device 605 may transmit communication information to the network entity 105-*b* after receiving the information request. In some cases, the communication information may include a first indication of a latency parameter for the EH-capable device 605, a second indication of at least one channel quality measurement associated with a channel bandwidth for communication between the network entity 105-*b* and the EH-capable device 605, or both. The latency parameter may indicate a latency level associated with the EH-capable device 605, such as a first latency level (e.g., a stringent latency constraint), a second latency level (e.g., a moderate latency constraint), or a third latency level (e.g., no latency constraint), among other examples. In some cases, the latency parameter of the EH-capable device 605 may be based on a battery level of the EH-capable device 605 (e.g., a battery capacity, a current battery life, or both), a type of the EH-capable device 605 (e.g., a tag for a sensor application may have a stringent latency constraint), a quality of service (QOS) level of the EH-capable device 605, or any combination thereof.

At 620, the network entity 105-*b* may configure a multisine waveform for transferring energy to the EH-capable device 605. In some cases, the network entity 105-*b* may determine a multisine waveform configuration for the multisine waveform based on the latency parameter for the EH-capable device 605, the at least one channel quality measurement, or both. The network entity 105-*b* may transmit a control message to the EH-capable device 605 (e.g., downlink control information (DCI), RRC signaling, or the like) indicating the multisine waveform configuration being applied for one or more subsequent multisine waveforms, as described herein and depicted in FIGS. 2-5. In some cases, the multisine waveform configuration may indicate a respective frequency location of each EH channel of multiple EH channels within the channel bandwidth associated with the multisine waveform. In some examples, the multisine waveform configuration may indicate one or more EH channel groups (e.g., n groups), where each EH channel group of the one or more EH channel groups may include a respective subset of the plurality of EH channels (e.g., m channels). For example, the multisine waveform configuration may indicate that the one or more EH channel groups are uniformly distributed across the channel bandwidth (e.g., improving multisine performance and frequency diversity). In some cases, a quantity of the one or more EH channel groups may be based on the at least one channel quality measurement (e.g., a maximum value of n may depend on a channel model).

In some cases, the network entity 105-*b* may determine the multisine waveform configuration according to the latency parameter for the EH-capable device 605. As an example, the multisine waveform configuration may indicate a first frequency location of a first subset of EH channels of the plurality of EH channels and a second frequency location of a second subset of EH channels of the plurality of EH channels based on the latency parameter for the EH-capable device 605, which may indicate the second latency level (e.g., a moderate latency constraint). In some cases, the first subset of EH channels may include a first set of contiguous PRBs of the channel bandwidth and the second subset of EH channels may include a second set of contiguous PRBs of the channel bandwidth. In some examples, the first frequency location may correspond to a first edge of the channel bandwidth and the second frequency location may correspond to a second edge of the channel bandwidth (see, e.g., FIG. 3A). Additionally, or alternatively, the first frequency location and the second frequency location may be spaced apart in frequency based on a frequency spacing value (e.g., a coherence bandwidth) that corresponds to the at least one channel quality measurement (see, e.g., FIG. 3B).

As another example, the multisine waveform configuration may indicate that the EH channels are distributed across the channel bandwidth based on the latency parameter for the EH-capable device 605, which may indicate the first latency level (e.g., a stringent latency constraint). In some cases, each EH channel may be placed individually such that at least one intervening PRB separates each pair of EH channels (see, e.g., FIG. 4).

As another example, the multisine waveform configuration may indicate that the EH channels include a set of contiguous PRBs of the channel bandwidth based on the latency parameter for the EH-capable device 605 (see, e.g., FIG. 5), which may indicate the third latency level (e.g., no latency constraint). Additionally, or alternatively, a frequency location of the set of contiguous PRBs may be based on the at least one channel quality measurement of the channel bandwidth (e.g., the network entity 105-*b* may place the EH channels to surround a PRB with a highest channel quality).

At 625, the network entity 105-*b* may transmit the multisine waveform to transfer energy to the EH-capable device 605. The multisine waveform may include the EH channels that are distributed according to the multisine waveform configuration. By configuring the multisine waveform according to the latency parameter and the channel quality measurements, an efficiency, reliability, or both of the energy transfer may be improved.

Figure 7:
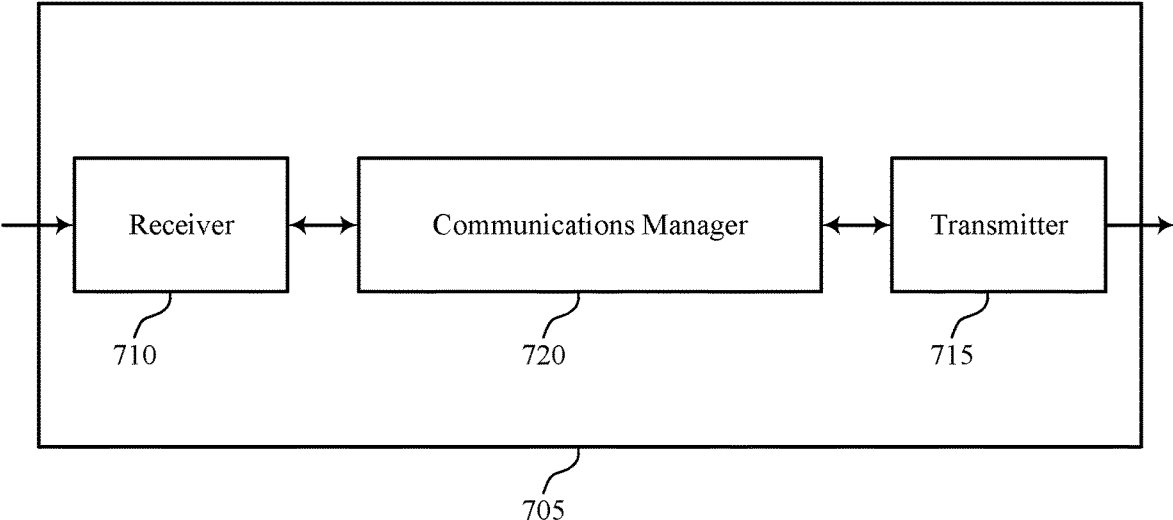
FIGS. 7 and 8 show block diagrams of devices that support channel allocation for wireless power transfer in accordance with one or more aspects of the present disclosure.

FIG. 7 shows a block diagram 700 of a device 705 that supports channel allocation for wireless power transfer in accordance with one or more aspects of the present disclosure. The device 705 may be an example of aspects of a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the channel allocation for wireless power transfer features discussed herein. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of channel allocation for wireless power transfer as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a wireless device in accordance with examples as disclosed herein. For example, the communications manager 720 is capable of, configured to, or operable to support a means for transmitting a request for latency information, channel quality information, or both, associated with an EH-capable device. The communications manager 720 is capable of, configured to, or operable to support a means for receiving, from the EH-capable device, a first indication of a latency parameter for the EH-capable device, a second indication of at least one channel quality measurement associated with a channel bandwidth for communication between the wireless device and the EH-capable device, or both. The communications manager 720 is capable of, configured to, or operable to support a means for transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for improving an efficiency and reliability of an energy transfer via a multisine waveform by configuring the multisine waveform according to receiver latency information, channel quality information, or both.

Figure 8:
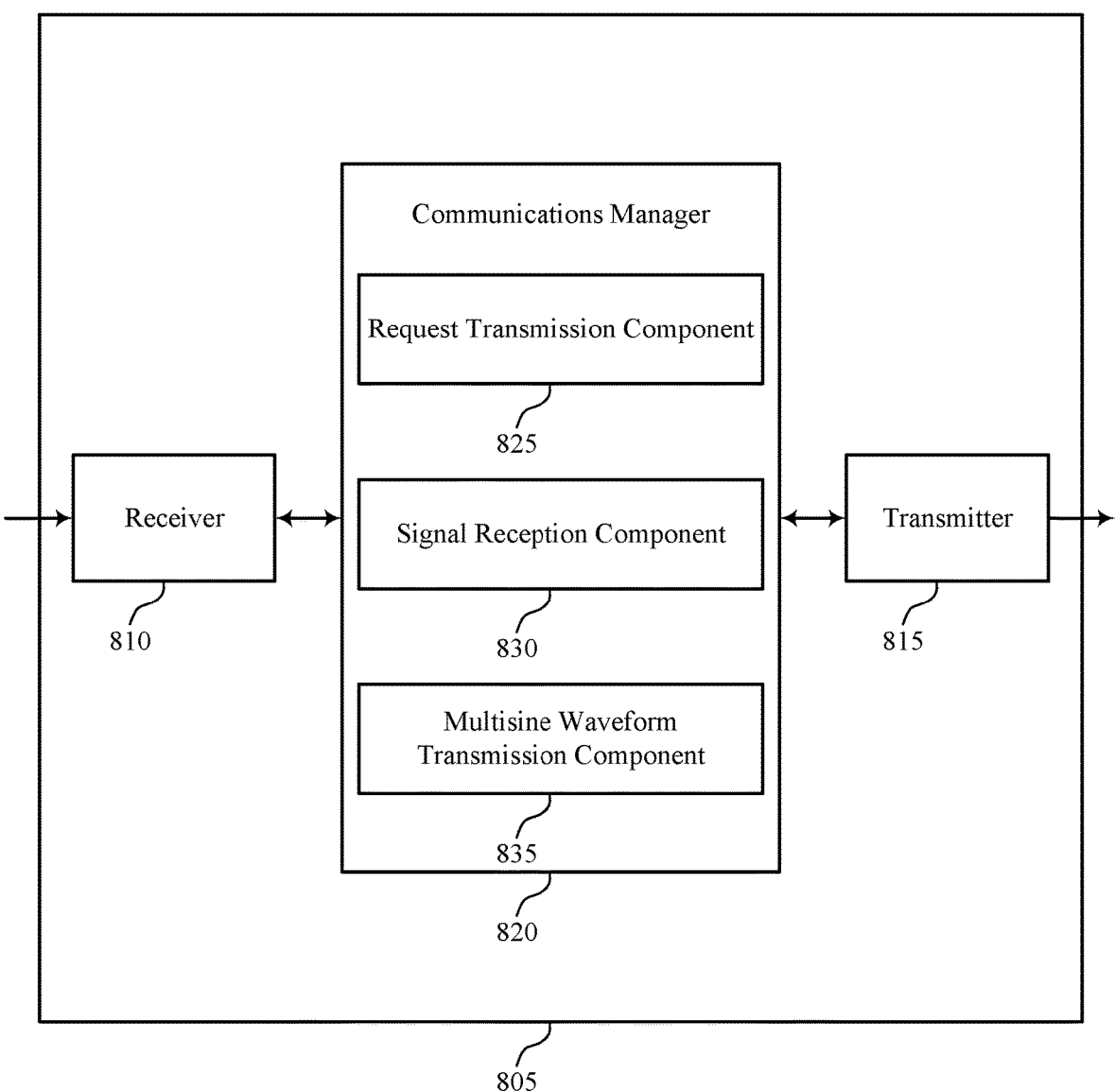

FIG. 8 shows a block diagram 800 of a device 805 that supports channel allocation for wireless power transfer in accordance with one or more aspects of the present disclosure. The device 805 may be an example of aspects of a device 705 or a network entity 105 as described herein. The device 805 may include a receiver 810, a transmitter 815, and a communications manager 820. The device, or one or more components of the device 805 (e.g., the receiver 810, the transmitter 815, the communications manager 820), may include at least one processor, which may be coupled with at least one memory, to support the techniques described herein. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of channel allocation for wireless power transfer as described herein. For example, the communications manager 820 may include a request transmission component 825, a signal reception component 830, a multisine waveform transmission component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a wireless device in accordance with examples as disclosed herein. The request transmission component 825 is capable of, configured to, or operable to support a means for transmitting a request for latency information, channel quality information, or both, associated with an EH-capable device. The signal reception component 830 is capable of, configured to, or operable to support a means for receiving, from the EH-capable device, a first indication of a latency parameter for the EH-capable device, a second indication of at least one channel quality measurement associated with a channel bandwidth for communication between the wireless device and the EH-capable device, or both. The multisine waveform transmission component 835 is capable of, configured to, or operable to support a means for transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

Figure 9:
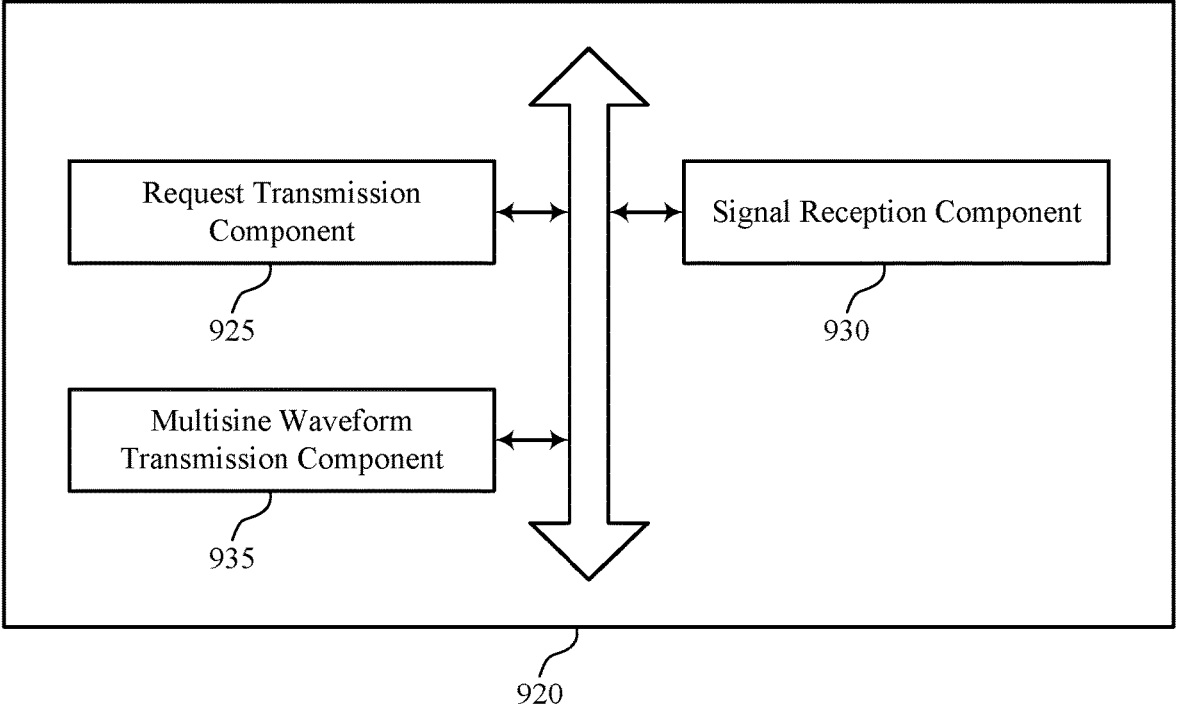
FIG. 9 shows a block diagram of a communications manager that supports channel allocation for wireless power transfer in accordance with one or more aspects of the present disclosure.

FIG. 9 shows a block diagram 900 of a communications manager 920 that supports channel allocation for wireless power transfer in accordance with one or more aspects of the present disclosure. The communications manager 920 may be an example of aspects of a communications manager 720, a communications manager 820, or both, as described herein. The communications manager 920, or various components thereof, may be an example of means for performing various aspects of channel allocation for wireless power transfer as described herein. For example, the communications manager 920 may include a request transmission component 925, a signal reception component 930, a multisine waveform transmission component 935, or any combination thereof. Each of these components, or sub-components thereof (e.g., at least one processor, at least one memory) may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a wireless device in accordance with examples as disclosed herein. The request transmission component 925 is capable of, configured to, or operable to support a means for transmitting a request for latency information, channel quality information, or both, associated with an EH-capable device. The signal reception component 930 is capable of, configured to, or operable to support a means for receiving, from the EH-capable device, a first indication of a latency parameter for the EH-capable device, a second indication of at least one channel quality measurement associated with a channel bandwidth for communication between the wireless device and the EH-capable device, or both. The multisine waveform transmission component 935 is capable of, configured to, or operable to support a means for transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

In some examples, the multisine waveform configuration indicates one or more EH channel groups, each EH channel group of the one or more EH channel groups including a respective subset of the set of multiple EH channels.

In some examples, the multisine waveform configuration indicates that the one or more EH channel groups are uniformly distributed across the channel bandwidth.

In some examples, a quantity of the one or more EH channel groups is based on the at least one channel quality measurement.

In some examples, the multisine waveform configuration indicates a first frequency location of a first subset of EH channels of the set of multiple EH channels and a second frequency location of a second subset of EH channels of the set of multiple EH channels based on the latency parameter for the EH-capable device, the first subset of EH channels including a first set of contiguous PRBs of the channel bandwidth and the second subset of EH channels including a second set of contiguous PRBs of the channel bandwidth.

In some examples, the first frequency location corresponds to a first edge of the channel bandwidth and the second frequency location corresponds to a second edge of the channel bandwidth.

In some examples, the first frequency location and the second frequency location are spaced apart in frequency based on a frequency spacing value that corresponds to the at least one channel quality measurement.

In some examples, the multisine waveform configuration indicates that the set of multiple EH channels are distributed across the channel bandwidth based on the latency parameter for the EH-capable device. In some examples, at least one physical intervening resource block separates each pair of EH channels of the set of multiple EH channels.

In some examples, the multisine waveform configuration indicates that the set of multiple EH channels includes a set of contiguous PRBs of the channel bandwidth based on the latency parameter for the EH-capable device.

In some examples, a frequency location of the set of contiguous PRBs is based on the at least one channel quality measurement of the channel bandwidth.

In some examples, the latency parameter is based on a battery level of the EH-capable device, a type of the EH-capable device, or both.

Figure 10:
FIG. 10 shows a diagram of a system including a device that supports channel allocation for wireless power transfer in accordance with one or more aspects of the present disclosure.

FIG. 10 shows a diagram of a system 1000 including a device 1005 that supports channel allocation for wireless power transfer in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The at least one memory 1025 may include RAM and ROM. The at least one memory 1025 may store computer-readable, computer-executable code 1030 including instructions that, when executed by the at least one processor 1035, cause the device 1005 to perform various functions described herein. The code 1030 may be stored in a non-transitory computer-readable medium such as system memory or another type of memory. In some cases, the code 1030 may not be directly executable by the at least one processor 1035 but may cause a computer (e.g., when compiled and executed) to perform functions described herein. In some cases, the at least one memory 1025 may contain, among other things, a BIOS which may control basic hardware or software operation such as the interaction with peripheral components or devices.

The at least one processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1035 may be configured to operate a memory array using a memory controller. In some other cases, a memory controller may be integrated into the at least one processor 1035. The at least one processor 1035 may be configured to execute computer-readable instructions stored in a memory (e.g., the at least one memory 1025) to cause the device 1005 to perform various functions (e.g., functions or tasks supporting channel allocation for wireless power transfer). For example, the device 1005 or a component of the device 1005 may include at least one processor 1035 and at least one memory 1025 coupled with the at least one processor 1035, the at least one processor 1035 and at least one memory 1025 configured to perform various functions described herein. In some examples, the at least one processor 1040 may include multiple processors, and the at least one memory 1030 may include multiple memories. One or more of the multiple processors may be coupled with one or more of the multiple memories, which may, individually or collectively, be configured to perform various functions herein.

The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within the at least one memory 1025). In some implementations, the at least one processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the at least one processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system.

A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a wireless device in accordance with examples as disclosed herein. For example, the communications manager 1020 is capable of, configured to, or operable to support a means for transmitting a request for latency information, channel quality information, or both, associated with an EH-capable device. The communications manager 1020 is capable of, configured to, or operable to support a means for receiving, from the EH-capable device, a first indication of a latency parameter for the EH-capable device, a second indication of at least one channel quality measurement associated with a channel bandwidth for communication between the wireless device and the EH-capable device, or both. The communications manager 1020 is capable of, configured to, or operable to support a means for transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

By including or configuring the communications manager 1020 in accordance with examples as described herein, the device 1005 may support techniques for improving an efficiency and reliability of an energy transfer via a multisine waveform by configuring the multisine waveform according to receiver latency information, channel quality information, or both.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the at least one processor 1035, the at least one memory 1025, the code 1030, or any combination thereof. For example, the code 1030 may include instructions executable by the at least one processor 1035 to cause the device 1005 to perform various aspects of channel allocation for wireless power transfer as described herein, or the at least one processor 1035 and the at least one memory 1025 may be otherwise configured to perform or support such operations.

Figure 11:
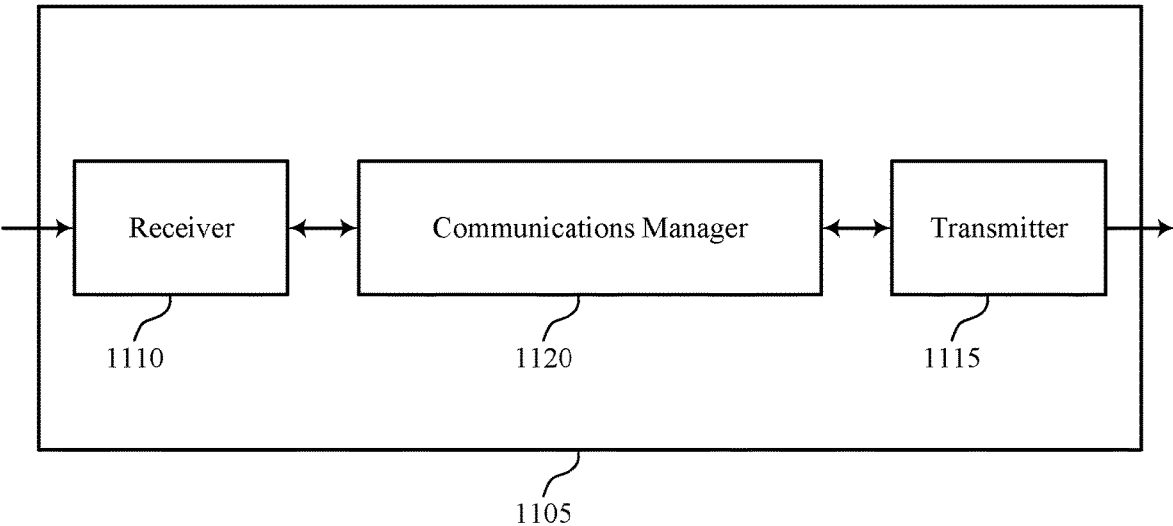
FIGS. 11 and 12 show block diagrams of devices that support channel allocation for wireless power transfer in accordance with one or more aspects of the present disclosure.

FIG. 11 shows a block diagram 1100 of a device 1105 that supports channel allocation for wireless power transfer in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the techniques described herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel allocation for wireless power transfer). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel allocation for wireless power transfer). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of channel allocation for wireless power transfer as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at an EH capable device in accordance with examples as disclosed herein. For example, the communications manager 1120 is capable of, configured to, or operable to support a means for receiving, from a wireless device, a request for latency information, channel quality information, or both, associated with the EH-capable device. The communications manager 1120 is capable of, configured to, or operable to support a means for transmitting, to the wireless device, a first indication of a latency parameter for the EH-capable device, a second indication of at least one channel quality measurement associated with a channel bandwidth for communication between the wireless device and the EH-capable device, or both. The communications manager 1120 is capable of, configured to, or operable to support a means for receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for improving an efficiency and reliability of an energy transfer via a multisine waveform by configuring the multisine waveform according to receiver latency information, channel quality information, or both.

Figure 12:
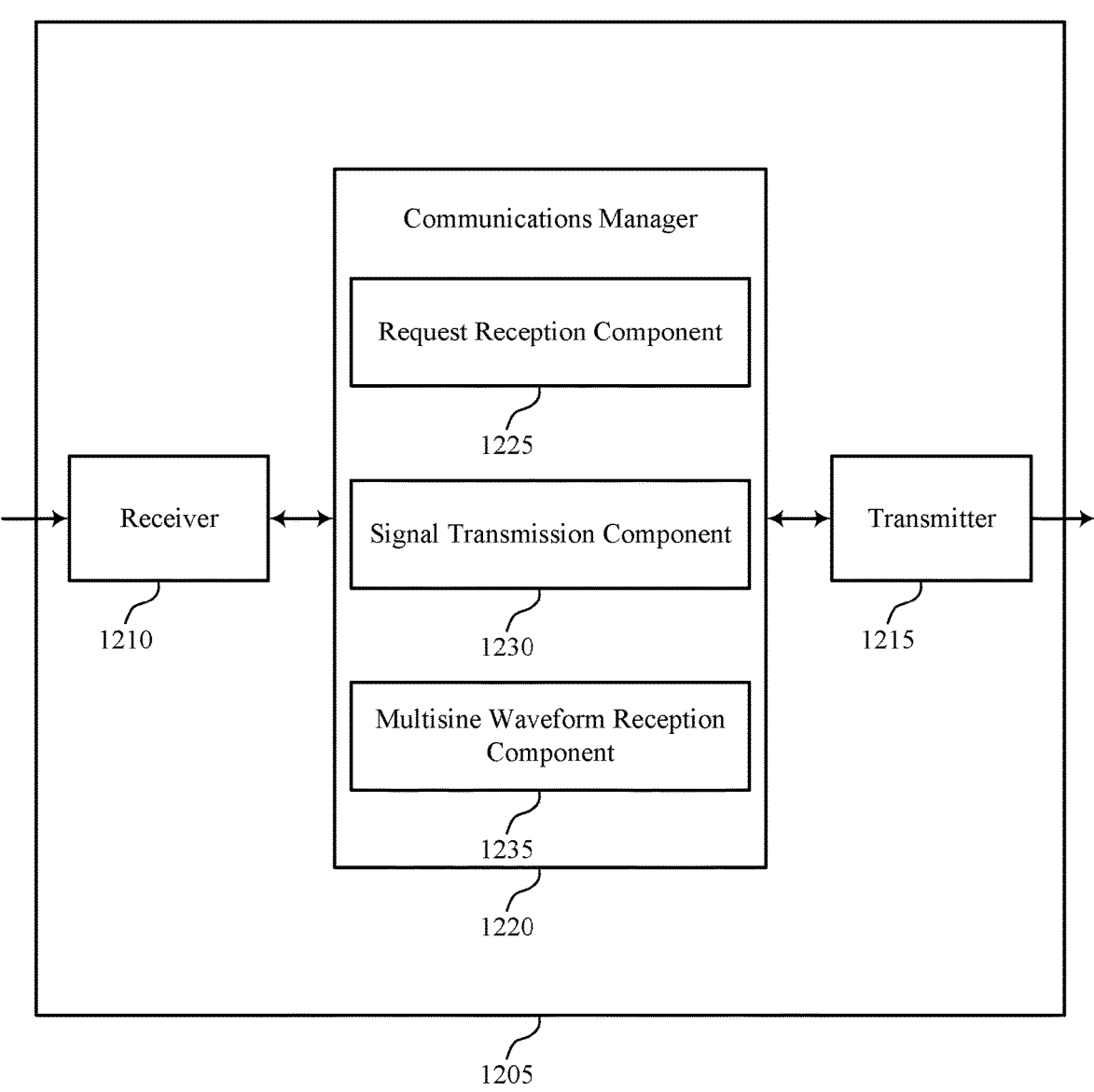

FIG. 12 shows a block diagram 1200 of a device 1205 that supports channel allocation for wireless power transfer in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to support the techniques described herein. Each of these components may be in communication with one another (e.g., via one or more buses).

The receiver 1210 may provide a means for receiving information such as packets, user data, control information, or any combination thereof associated with various information channels (e.g., control channels, data channels, information channels related to channel allocation for wireless power transfer). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to channel allocation for wireless power transfer). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of channel allocation for wireless power transfer as described herein. For example, the communications manager 1220 may include a request reception component 1225, a signal transmission component 1230, a multisine waveform reception component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at an EH capable device in accordance with examples as disclosed herein. The request reception component 1225 is capable of, configured to, or operable to support a means for receiving, from a wireless device, a request for latency information, channel quality information, or both, associated with the EH-capable device. The signal transmission component 1230 is capable of, configured to, or operable to support a means for transmitting, to the wireless device, a first indication of a latency parameter for the EH-capable device, a second indication of at least one channel quality measurement associated with a channel bandwidth for communication between the wireless device and the EH-capable device, or both. The multisine waveform reception component 1235 is capable of, configured to, or operable to support a means for receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

Figure 13:
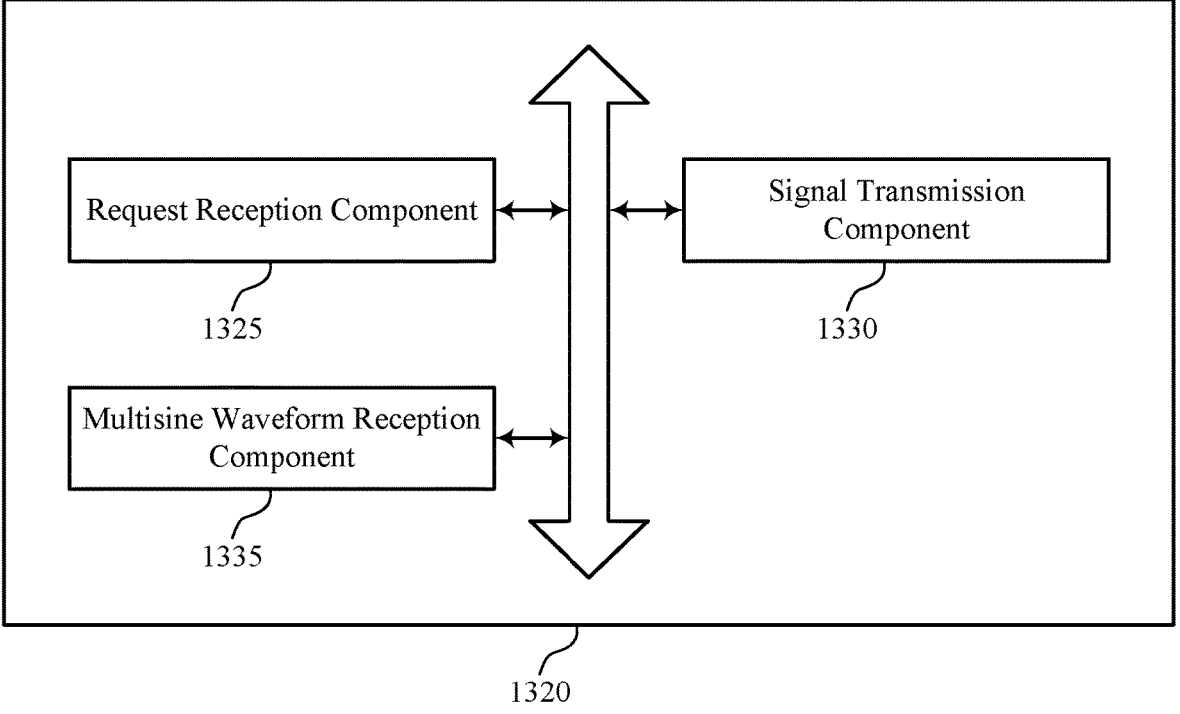
FIG. 13 shows a block diagram of a communications manager that supports channel allocation for wireless power transfer in accordance with one or more aspects of the present disclosure.

FIG. 13 shows a block diagram 1300 of a communications manager 1320 that supports channel allocation for wireless power transfer in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of channel allocation for wireless power transfer as described herein. For example, the communications manager 1320 may include a request reception component 1325, a signal transmission component 1330, a multisine waveform reception component 1335, or any combination thereof. Each of these components, or sub-components thereof (e.g., at least one processor, at least one memory) may communicate, directly or indirectly, with one another (e.g., via one or more buses).

The communications manager 1320 may support wireless communications at an EH capable device in accordance with examples as disclosed herein. The request reception component 1325 is capable of, configured to, or operable to support a means for receiving, from a wireless device, a request for latency information, channel quality information, or both, associated with the EH-capable device. The signal transmission component 1330 is capable of, configured to, or operable to support a means for transmitting, to the wireless device, a first indication of a latency parameter for the EH-capable device, a second indication of at least one channel quality measurement associated with a channel bandwidth for communication between the wireless device and the EH-capable device, or both. The multisine waveform reception component 1335 is capable of, configured to, or operable to support a means for receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

In some examples, the multisine waveform configuration indicates one or more EH channel groups, each EH channel group of the one or more EH channel groups including a respective subset of the set of multiple EH channels.

In some examples, the multisine waveform configuration indicates that the one or more EH channel groups are uniformly distributed across the channel bandwidth.

In some examples, a quantity of the one or more EH channel groups is based on the at least one channel quality measurement.

In some examples, the multisine waveform configuration indicates a first frequency location of a first subset of EH channels of the set of multiple EH channels and a second frequency location of a second subset of EH channels of the set of multiple EH channels based on the latency parameter for the EH-capable device, the first subset of EH channels including a first set of contiguous PRBs of the channel bandwidth and the second subset of EH channels including a second set of contiguous PRBs of the channel bandwidth.

In some examples, the first frequency location corresponds to a first edge of the channel bandwidth and the second frequency location corresponds to a second edge of the channel bandwidth.

In some examples, the first frequency location and the second frequency location are spaced apart in frequency based on a frequency spacing value that corresponds to the at least one channel quality measurement.

In some examples, the multisine waveform configuration indicates that the set of multiple EH channels are distributed across the channel bandwidth based on the latency parameter for the EH-capable device. In some examples, at least one physical intervening resource block separates each pair of EH channels of the set of multiple EH channels.

In some examples, the multisine waveform configuration indicates that the set of multiple EH channels includes a set of contiguous PRBs of the channel bandwidth based on the latency parameter for the EH-capable device.

In some examples, a frequency location of the set of contiguous PRBs is based on the at least one channel quality measurement.

In some examples, the latency parameter is based on a battery level of the EH-capable device, a type of the EH-capable device, or both.

Figure 14:
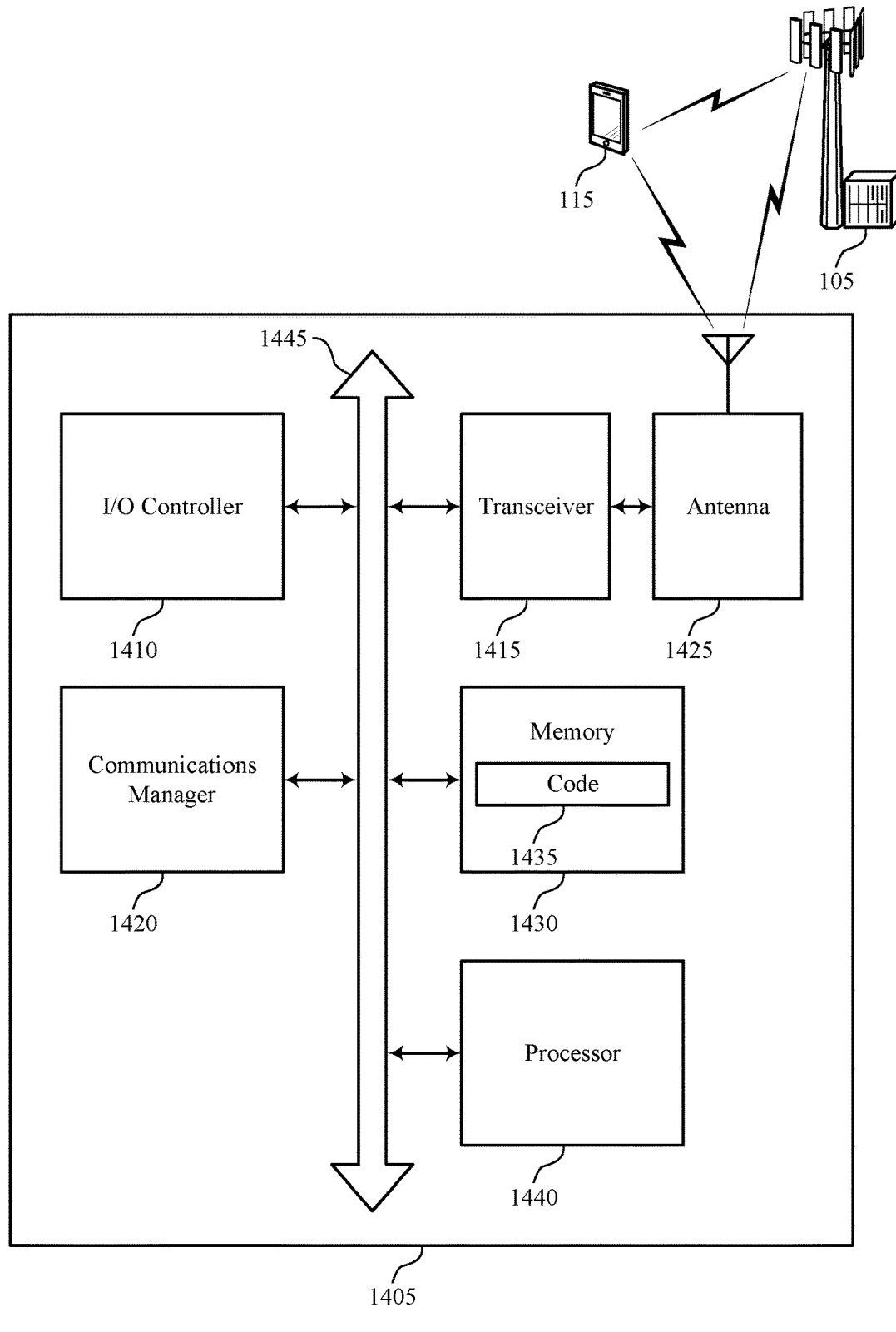
FIG. 14 shows a diagram of a system including a device that supports channel allocation for wireless power transfer in accordance with one or more aspects of the present disclosure.

FIG. 14 shows a diagram of a system 1400 including a device 1405 that supports channel allocation for wireless power transfer in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the at least one processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425.

The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, at least one the memory 1430 may contain, among other things, a basic I/O system (BIOS) which may control basic hardware or software operation such as the interaction with peripheral components or devices.

The at least one processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the at least one memory 1430) to cause the device 1405 to perform various functions (e.g., functions or tasks supporting channel allocation for wireless power transfer). For example, the device 1405 or a component of the device 1405 may include at least one processor 1440 and at least one memory 1430 coupled with or to the processor 1440, the at least one processor 1440 and at least one memory 1430 configured to perform various functions described herein.

The communications manager 1420 may support wireless communications at an EH capable device in accordance with examples as disclosed herein. For example, the communications manager 1420 is capable of, configured to, or operable to support a means for receiving, from a wireless device, a request for latency information, channel quality information, or both, associated with the EH-capable device. The communications manager 1420 is capable of, configured to, or operable to support a means for transmitting, to the wireless device, a first indication of a latency parameter for the EH-capable device, a second indication of at least one channel quality measurement associated with a channel bandwidth for communication between the wireless device and the EH-capable device, or both. The communications manager 1420 is capable of, configured to, or operable to support a means for receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both.

By including or configuring the communications manager 1420 in accordance with examples as described herein, the device 1405 may support techniques for improving an efficiency and reliability of an energy transfer via a multisine waveform by configuring the multisine waveform according to receiver latency information, channel quality information, or both.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the at least one memory 1430, the code 1435, or any combination thereof. For example, the code 1435 may include instructions executable by the at least one processor 1440 to cause the device 1405 to perform various aspects of channel allocation for wireless power transfer as described herein, or the at least one processor 1440 and the at least one memory 1430 may be otherwise configured to perform or support such operations.

Figure 15:
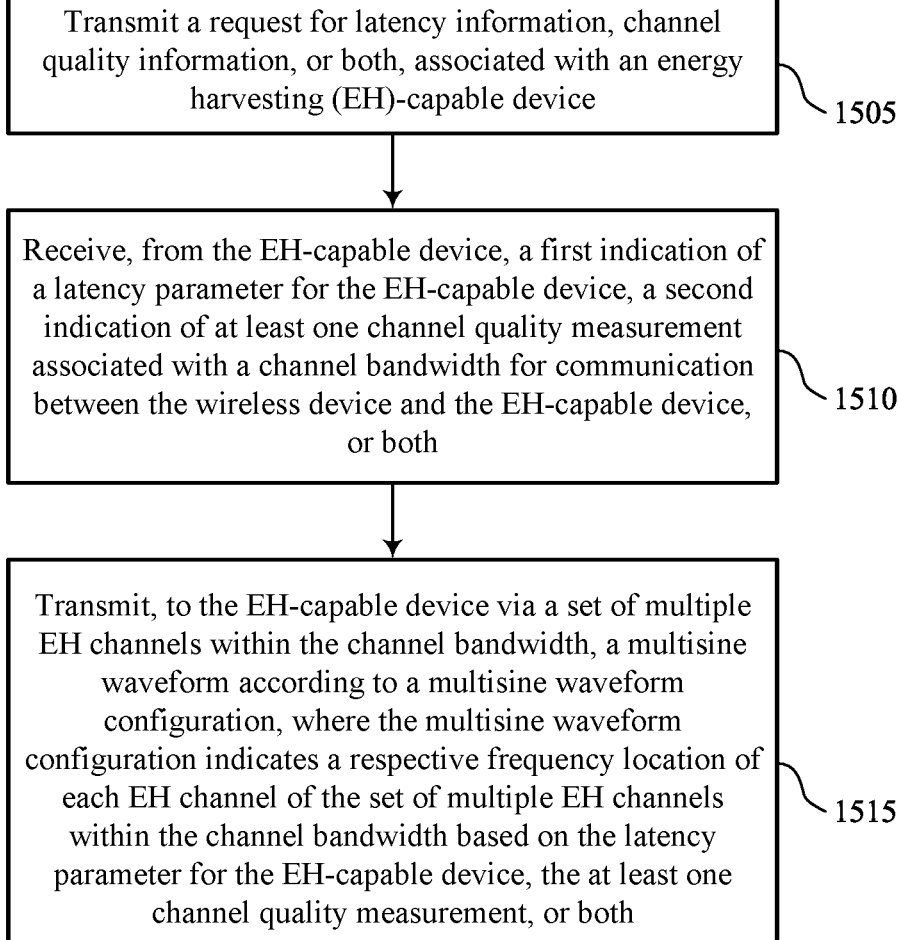

FIG. 15 shows a flowchart illustrating a method 1500 that supports channel allocation for wireless power transfer in accordance with aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a request for latency information, channel quality information, or both, associated with an EH-capable device. The operations of block 1505 may be performed in accordance with examples as disclosed herein. In some examples, aspects of the operations of 1505 may be performed by a request transmission component 925 as described with reference to FIG. 9.

At 1510, the method may include receiving, from the EH-capable device, a first indication of a latency parameter for the EH-capable device, a second indication of at least one channel quality measurement associated with a channel bandwidth for communication between the wireless device and the EH-capable device, or both. The operations of block 1510 may be performed in accordance with examples as disclosed herein. In some examples, aspects of the operations of 1510 may be performed by a signal reception component 930 as described with reference to FIG. 9.

At 1515, the method may include transmitting, to the EH-capable device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both. The operations of block 1515 may be performed in accordance with examples as disclosed herein. In some examples, aspects of the operations of 1515 may be performed by a multisine waveform transmission component 935 as described with reference to FIG. 9.

FIG. 16 shows a flowchart illustrating a method 1600 that supports channel allocation for wireless power transfer in accordance with aspects of the present disclosure. The operations of the method 1600 may be implemented by a UE or its components as described herein. For example, the operations of the method 1600 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1605, the method may include receiving, from a wireless device, a request for latency information, channel quality information, or both, associated with the EH-capable device. The operations of block 1605 may be performed in accordance with examples as disclosed herein. In some examples, aspects of the operations of 1605 may be performed by a request reception component 1325 as described with reference to FIG. 13.

At 1610, the method may include transmitting, to the wireless device, a first indication of a latency parameter for the EH-capable device, a second indication of at least one channel quality measurement associated with a channel bandwidth for communication between the wireless device and the EH-capable device, or both. The operations of block 1610 may be performed in accordance with examples as disclosed herein. In some examples, aspects of the operations of 1610 may be performed by a signal transmission component 1330 as described with reference to FIG. 13.

At 1615, the method may include receiving, from the wireless device via a set of multiple EH channels within the channel bandwidth, a multisine waveform according to a multisine waveform configuration, where the multisine waveform configuration indicates a respective frequency location of each EH channel of the set of multiple EH channels within the channel bandwidth based on the latency parameter for the EH-capable device, the at least one channel quality measurement, or both. The operations of block 1615 may be performed in accordance with examples as disclosed herein. In some examples, aspects of the operations of 1615 may be performed by a multisine waveform reception component 1335 as described with reference to FIG. 13.

The following provides an overview of aspects of the present disclosure:

Aspect 1: A method for wireless communications at a wireless device, comprising: transmitting a request for latency information, channel quality information, or both, associated with an EH-capable device; receiving, from the EH-capable device, a first indication of a latency parameter for the EH-capable device, a second indication of at least one channel quality measurement associated with a channel bandwidth for communication between the wireless device and the EH-capable device, or both; and transmitting, to the EH-capable device via a plurality of EH channels within the channel bandwidth, a multisine waveform according to a multisine waveform configuration, wherein the multisine waveform configuration indicates a respective frequency location of each EH channel of the plurality of EH channels within the channel bandwidth based at least in part on the latency parameter for the EH-capable device, the at least one channel quality measurement, or both.

Aspect 2: The method of aspect 1, wherein the multisine waveform configuration indicates one or more EH channel groups, each EH channel group of the one or more EH channel groups comprising a respective subset of the plurality of EH channels.

Aspect 3: The method of aspect 2, wherein the multisine waveform configuration indicates that the one or more EH channel groups are uniformly distributed across the channel bandwidth.

Aspect 4: The method of any of aspects 2 through 3, wherein a quantity of the one or more EH channel groups is based at least in part on the at least one channel quality measurement.

Aspect 5: The method of any of aspects 1 through 4, wherein the multisine waveform configuration indicates a first frequency location of a first subset of EH channels of the plurality of EH channels and a second frequency location of a second subset of EH channels of the plurality of EH channels based at least in part on the latency parameter for the EH-capable device, the first subset of EH channels comprising a first set of contiguous PRBs of the channel bandwidth and the second subset of EH channels comprising a second set of contiguous PRBs of the channel bandwidth.

Aspect 6: The method of aspect 5, wherein the first frequency location corresponds to a first edge of the channel bandwidth and the second frequency location corresponds to a second edge of the channel bandwidth.

Aspect 7: The method of any of aspects 5 through 6, wherein the first frequency location and the second frequency location are spaced apart in frequency based at least in part on a frequency spacing value that corresponds to the at least one channel quality measurement.

Aspect 8: The method of any of aspects 1 through 7, wherein the multisine waveform configuration indicates that the plurality of EH channels are distributed across the channel bandwidth based at least in part on the latency parameter for the EH-capable device, at least one physical intervening resource block separates each pair of EH channels of the plurality of EH channels.

Aspect 9: The method of any of aspects 1 through 8, wherein the multisine waveform configuration indicates that the plurality of EH channels comprises a set of contiguous PRBs of the channel bandwidth based at least in part on the latency parameter for the EH-capable device.

Aspect 10: The method of aspect 9, wherein a frequency location of the set of contiguous PRBs is based at least in part on the at least one channel quality measurement of the channel bandwidth.

Aspect 11: The method of any of aspects 1 through 10, wherein the latency parameter is based at least in part on a battery level of the EH-capable device, a type of the EH-capable device, or both.

Aspect 12: A method for wireless communications at an EH capable device, comprising: receiving, from a wireless device, a request for latency information, channel quality information, or both, associated with the EH-capable device; transmitting, to the wireless device, a first indication of a latency parameter for the EH-capable device, a second indication of at least one channel quality measurement associated with a channel bandwidth for communication between the wireless device and the EH-capable device, or both; and receiving, from the wireless device via a plurality of EH channels within the channel bandwidth, a multisine waveform according to a multisine waveform configuration, wherein the multisine waveform configuration indicates a respective frequency location of each EH channel of the plurality of EH channels within the channel bandwidth based at least in part on the latency parameter for the EH-capable device, the at least one channel quality measurement, or both.

Aspect 13: The method of aspect 12, wherein the multisine waveform configuration indicates one or more EH channel groups, each EH channel group of the one or more EH channel groups comprising a respective subset of the plurality of EH channels.

Aspect 14: The method of aspect 13, wherein the multisine waveform configuration indicates that the one or more EH channel groups are uniformly distributed across the channel bandwidth.

Aspect 15: The method of any of aspects 13 through 14, wherein a quantity of the one or more EH channel groups is based at least in part on the at least one channel quality measurement.

Aspect 16: The method of any of aspects 12 through 15, wherein the multisine waveform configuration indicates a first frequency location of a first subset of EH channels of the plurality of EH channels and a second frequency location of a second subset of EH channels of the plurality of EH channels based at least in part on the latency parameter for the EH-capable device, the first subset of EH channels comprising a first set of contiguous PRBs of the channel bandwidth and the second subset of EH channels comprising a second set of contiguous PRBs of the channel bandwidth.

Aspect 17: The method of aspect 16, wherein the first frequency location corresponds to a first edge of the channel bandwidth and the second frequency location corresponds to a second edge of the channel bandwidth.

Aspect 18: The method of any of aspects 16 through 17, wherein the first frequency location and the second frequency location are spaced apart in frequency based at least in part on a frequency spacing value that corresponds to the at least one channel quality measurement.

Aspect 19: The method of any of aspects 12 through 18, wherein the multisine waveform configuration indicates that the plurality of EH channels are distributed across the channel bandwidth based at least in part on the latency parameter for the EH-capable device, at least one physical intervening resource block separates each pair of EH channels of the plurality of EH channels.

Aspect 20: The method of any of aspects 12 through 19, wherein the multisine waveform configuration indicates that the plurality of EH channels comprises a set of contiguous PRBs of the channel bandwidth based at least in part on the latency parameter for the EH-capable device.

Aspect 21: The method of aspect 20, wherein a frequency location of the set of contiguous PRBs is based at least in part on the at least one channel quality measurement.

Aspect 22: The method of any of aspects 12 through 21, wherein the latency parameter is based at least in part on a battery level of the EH-capable device, a type of the EH-capable device, or both.

Aspect 23: An apparatus for wireless communications at a wireless device, comprising at least one processor; at least one memory coupled with the at least one processor; and instructions stored in the at least one memory and executable by the at least one processor to cause the apparatus to perform a method of any of aspects 1 through 11.

Aspect 24: An apparatus for wireless communications at a wireless device, comprising at least one means for performing a method of any of aspects 1 through 11.

Aspect 25: A non-transitory computer-readable medium storing code for wireless communications at a wireless device, the code comprising instructions executable by a processor to perform a method of any of aspects 1 through 11.

Aspect 26: An apparatus for wireless communications at an EH capable device, comprising at least one processor; at least one memory coupled with the at least one processor; and instructions stored in the at least one memory and executable by the at least one processor to cause the apparatus to perform a method of any of aspects 12 through 22.

Aspect 27: An apparatus for wireless communications at an EH capable device, comprising at least one means for performing a method of any of aspects 12 through 22.

Aspect 28: A non-transitory computer-readable medium storing code for wireless communications at an EH capable device, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by a processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

Any functions or operations described herein as being capable of being performed by a memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:
   at least one memory; and
   at least one processor coupled to the at least one memory, the at least one processor configured to:
      transmit a request for latency information, channel quality information, or both, associated with an energy harvesting (EH)-capable device;
      receive, from the EH-capable device, a first indication of a latency parameter for the EH-capable device, a second indication of at least one channel quality measurement associated with a channel bandwidth for communication between the wireless device and the EH-capable device, or both; and
      transmit, to the EH-capable device via a plurality of EH channels within the channel bandwidth, a multisine waveform according to a multisine waveform configuration, wherein the multisine waveform configuration indicates a plurality of frequency locations based at least in part on the latency parameter for the EH-capable device, the at least one channel quality measurement, or both, each frequency location of the plurality of frequency locations corresponding to a respective EH channel of the plurality of EH channels within the channel bandwidth.

2. The apparatus of claim 1, wherein the multisine waveform configuration indicates one or more EH channel groups, each EH channel group of the one or more EH channel groups comprising a respective subset of the plurality of EH channels.

3. The apparatus of claim 2, wherein the multisine waveform configuration indicates that the one or more EH channel groups are uniformly distributed across the channel bandwidth.

4. The apparatus of claim 2, wherein a quantity of the one or more EH channel groups is based at least in part on the at least one channel quality measurement.

5. The apparatus of claim 1, wherein the multisine waveform configuration indicates a first subset of frequency locations of the plurality of frequency locations corresponding to a first subset of EH channels of the plurality of EH channels and a second subset of frequency locations of the plurality of frequency locations corresponding to a second subset of EH channels of the plurality of EH channels based at least in part on the latency parameter for the EH-capable device, the first subset of EH channels comprising a first set of contiguous physical resource blocks of the channel bandwidth and the second subset of EH channels comprising a second set of contiguous physical resource blocks of the channel bandwidth.

6. The apparatus of claim 5, wherein the first subset of frequency locations correspond to a first edge of the channel bandwidth and the second subset of frequency locations correspond to a second edge of the channel bandwidth.

7. The apparatus of claim 5, wherein the first subset of frequency locations and the second subset of frequency locations are spaced apart in frequency based at least in part on a frequency spacing value that corresponds to the at least one channel quality measurement.

8. The apparatus of claim 1, wherein the multisine waveform configuration indicates that the plurality of EH channels are distributed across the channel bandwidth based at least in part on the latency parameter for the EH-capable device, and wherein at least one physical intervening resource block separates each pair of EH channels of the plurality of EH channels.

9. The apparatus of claim 1, wherein the multisine waveform configuration indicates that the plurality of EH channels comprises a set of contiguous physical resource blocks of the channel bandwidth based at least in part on the latency parameter for the EH-capable device.

10. The apparatus of claim 9, wherein a set of frequency locations of the set of contiguous physical resource blocks is based at least in part on the at least one channel quality measurement of the channel bandwidth.

11. The apparatus of claim 1, wherein the latency parameter is based at least in part on a battery level of the EH-capable device, a type of the EH-capable device, or both.

12. An apparatus for wireless communications at an energy harvesting (EH) capable device, comprising:
at least one memory; and
at least one processor coupled to the at least one memory, the at least one processor configured to:
receive, from a wireless device, a request for latency information, channel quality information, or both, associated with the EH-capable device;
transmit, to the wireless device, a first indication of a latency parameter for the EH-capable device, a second indication of at least one channel quality measurement associated with a channel bandwidth for communication between the wireless device and the EH-capable device, or both; and
receive, from the wireless device via a plurality of EH channels within the channel bandwidth, a multisine waveform according to a multisine waveform configuration, wherein the multisine waveform configuration indicates a plurality of frequency locations based at least in part on the latency parameter for the EH-capable device, the at least one channel quality measurement, or both, each frequency location of the plurality of frequency locations corresponding to a respective EH channel of the plurality of EH channels within the channel bandwidth.

13. The apparatus of claim 12, wherein the multisine waveform configuration indicates one or more EH channel groups, each EH channel group of the one or more EH channel groups comprising a respective subset of the plurality of EH channels.

14. The apparatus of claim 13, wherein the multisine waveform configuration indicates that the one or more EH channel groups are uniformly distributed across the channel bandwidth.

15. The apparatus of claim 13, wherein a quantity of the one or more EH channel groups is based at least in part on the at least one channel quality measurement.

16. The apparatus of claim 12, wherein the multisine waveform configuration indicates a first subset of frequency locations of the plurality of frequency locations corresponding to a first subset of EH channels of the plurality of EH channels and a second subset of frequency locations of the plurality of frequency locations corresponding to a second subset of EH channels of the plurality of EH channels based at least in part on the latency parameter for the EH-capable device, the first subset of EH channels comprising a first set of contiguous physical resource blocks of the channel bandwidth and the second subset of EH channels comprising a second set of contiguous physical resource blocks of the channel bandwidth.

17. The apparatus of claim 16, wherein the first subset of frequency locations correspond to a first edge of the channel bandwidth and the second subset of frequency locations correspond to a second edge of the channel bandwidth.

18. The apparatus of claim 16, wherein the first subset of frequency locations and the second subset of frequency locations are spaced apart in frequency based at least in part on a frequency spacing value that corresponds to the at least one channel quality measurement.

19. The apparatus of claim 12, wherein the multisine waveform configuration indicates that the plurality of EH channels are distributed across the channel bandwidth based at least in part on the latency parameter for the EH-capable device, and wherein at least one physical intervening resource block separates each pair of EH channels of the plurality of EH channels.

20. The apparatus of claim 12, wherein the multisine waveform configuration indicates that the plurality of EH channels comprises a set of contiguous physical resource blocks of the channel bandwidth based at least in part on the latency parameter for the EH-capable device.

21. The apparatus of claim 20, wherein a frequency location of the set of contiguous physical resource blocks is based at least in part on the at least one channel quality measurement.

22. The apparatus of claim 12, wherein the latency parameter is based at least in part on a battery level of the EH-capable device, a type of the EH-capable device, or both.

23. A method for wireless communications at a wireless device, comprising:
transmitting a request for latency information, channel quality information, or both, associated with an energy harvesting (EH)-capable device;
receiving, from the EH-capable device, a first indication of a latency parameter for the EH-capable device, a second indication of at least one channel quality measurement associated with a channel bandwidth for communication between the wireless device and the EH-capable device, or both; and
transmitting, to the EH-capable device via a plurality of EH channels within the channel bandwidth, a multisine waveform according to a multisine waveform configuration, wherein the multisine waveform configuration indicates a plurality of frequency locations based at least in part on the latency parameter for the EH-capable device, the at least one channel quality measurement, or both, each frequency location of the plurality of frequency locations corresponding to a respective EH channel of the plurality of EH channels within the channel bandwidth.

24. The method of claim 23, wherein the multisine waveform configuration indicates one or more EH channel groups, each EH channel group of the one or more EH channel groups comprising a respective subset of the plurality of EH channels.

25. The method of claim 24, wherein the multisine waveform configuration indicates that the one or more EH channel groups are uniformly distributed across the channel bandwidth.

26. The method of claim 24, wherein a quantity of the one or more EH channel groups is based at least in part on the at least one channel quality measurement.

27. The method of claim 23, wherein the multisine waveform configuration indicates a first subset of frequency locations of the plurality of frequency locations corresponding to a first subset of EH channels of the plurality of EH channels and a second subset of frequency locations of the plurality of frequency locations corresponding to a second subset of EH channels of the plurality of EH channels based at least in part on the latency parameter for the EH-capable device, the first subset of EH channels comprising a first set of contiguous physical resource blocks of the channel bandwidth and the second subset of EH channels comprising a second set of contiguous physical resource blocks of the channel bandwidth.

28. The method of claim 27, wherein the first subset of frequency locations correspond to a first edge of the channel bandwidth and the second subset of frequency locations correspond to a second edge of the channel bandwidth.

29. The method of claim 27, wherein the first subset of frequency locations and the second subset of frequency locations are spaced apart in frequency based at least in part on a frequency spacing value that corresponds to the at least one channel quality measurement.

30. A method for wireless communications at an energy harvesting (EH) capable device, comprising:

receiving, from a wireless device, a request for latency information, channel quality information, or both, associated with the EH-capable device;

transmitting, to the wireless device, a first indication of a latency parameter for the EH-capable device, a second indication of at least one channel quality measurement associated with a channel bandwidth for communication between the wireless device and the EH-capable device, or both; and receiving, from the wireless device via a plurality of EH channels within the channel bandwidth, a multisine waveform according to a multisine waveform configuration, wherein the multisine waveform configuration indicates a plurality of frequency locations based at least in part on the latency parameter for the EH-capable device, the at least one channel quality measurement, or both, each frequency location of the plurality of frequency locations corresponding to a respective EH channel of the plurality of EH channels within the channel bandwidth.

* * * * *